United States Patent
Swensen et al.

[19]

[11] Patent Number: 5,558,582
[45] Date of Patent: Sep. 24, 1996

[54] ROTATING MOTION SIMULATOR

[75] Inventors: Loran L. Swensen; Jonathan E. Neville, both of South Jordan, Utah

[73] Assignee: Enhanced Simulation, Inc., Salt Lake City, Utah

[21] Appl. No.: 323,366

[22] Filed: Oct. 14, 1994

[51] Int. Cl.⁶ ........................................... A63G 31/08
[52] U.S. Cl. ................... 472/43; 472/47; 472/59
[58] Field of Search ................... 472/43, 46, 47, 472/59, 131, 130, 29, 36; 434/30, 34, 46, 55, 59

[56] References Cited

U.S. PATENT DOCUMENTS

| | | |
|---|---|---|
| 4,066,256 | 1/1978 | Trumbull . |
| 4,251,140 | 2/1981 | Fogerty, Jr. . |
| 4,303,236 | 12/1981 | Czarnecki . |
| 4,418,911 | 12/1983 | Bowers et al. ............ 472/130 X |
| 4,461,470 | 7/1984 | Astroth et al. . |
| 4,642,945 | 2/1987 | Browning et al. . |
| 4,710,128 | 12/1987 | Wachsmuth ................ 434/46 |
| 4,710,129 | 12/1987 | Newman et al. . |
| 4,856,771 | 8/1989 | Nelson et al. . |
| 4,874,162 | 10/1989 | Trumbull et al. . |
| 4,879,849 | 11/1989 | Hollingsworth, III et al. . |
| 4,885,878 | 12/1989 | Wuu . |
| 4,940,234 | 7/1990 | Ishida et al. ............ 273/1 GA |
| 5,015,933 | 5/1991 | Watkins et al. . |
| 5,052,932 | 10/1991 | Trani ................ 472/130 X |
| 5,060,932 | 10/1991 | Yamaguchi ................ 472/47 |
| 5,071,352 | 10/1991 | Denne . |
| 5,179,525 | 1/1993 | Griffis ................ 364/512 |
| 5,182,150 | 1/1993 | Carlos et al. . |
| 5,192,247 | 3/1993 | Barr et al. . |
| 5,199,875 | 4/1993 | Trumbull . |
| 5,203,563 | 4/1993 | Loper ................ 273/148 R |
| 5,299,810 | 4/1994 | Pierce et al. ............ 273/434 |
| 5,366,375 | 11/1994 | Sarnicola ................ 434/37 |

*Primary Examiner*—Kien T. Nguyen
*Attorney, Agent, or Firm*—Lloyd W. Sadler; Daniel P. McCarthy; Jon C: Christiansen

[57] ABSTRACT

A motion simulator having a people-holding capsule attached at the front end and at the rear end to a supporting structure. The supporting structure has movable arms that, when extended or retracted, provide positive and negative pitch to the capsule. The supporting structure also provides the mechanism for rotating the capsule up to and in excess of 360 degrees. It is also possible to make the support structure capable of supporting forward/backward as well as side-by-side motion. With a video display system installed inside the capsule providing optical cues, this invention provides the motion cues necessary to provide a safe entertainment environment for passengers.

23 Claims, 6 Drawing Sheets

ROTATING MOTION SIMULATOR

BACKGROUND OF THE INVENTION

A. Field of the Invention

The field of this invention is motion simulators. More particularly and in the preferred embodiment, the invention is a motion simulator which provides (1) full 360 degree roll capability combined with forward/backward, lateral, and up/down motion, (2) size that permits portability, (3) and simple, reliable operation. The motion system is controlled externally by a preprogrammed set of commands executed by an external Processing Unit. The motion system will seat multiple rows of passengers and when combined with a visual display system and sound system, will provide a complete simulation environment to the passengers.

As a motion simulator, this invention is used to provide motion sensations to passengers riding inside the simulator. This motion simulator is used primarily in entertainment applications, such as in amusement parks. During operation the passengers ride inside a capsule, observing a visual scene on a display screen at the front of the capsule and hearing sound from speakers placed inside the capsule. The motion simulator moves the capsule in synchronization with the displayed visual scene, greatly enhancing the realism and quality of the entertainment experience.

B. Description of Related Art

It is desirable in providing a simulation environment to provide physical motion to the passengers. This motion adds to the realism of the simulation experience. A variety of motion devices have been developed to meet this need. Degrees of movement within motion simulators has traditionally been described in terms of the number of "degrees of freedom" (DOF). A 3-DOF motion base would provide heave (up and down), roll (tipping down on either side) and pitch (tipping down in the front or the back). A 4-DOF motion base would add surge (linear forward and backward) with a 6-DOF motion base adding sway (twisting the front or rear sideways) and linear sideways movement. Generally, the prior art devices fall into one of three categories, which can be classified as pivot type, bench type and sled type simulators.

Pivot type simulators typically use actuators positioned underneath the motion platform. Seats for passengers ar placed on top of the platform. Sometimes these seats are enclosed in a compartment, sometimes the these seats are open as within a theater. Movement within a pivot type simulator depends on the particular design, with 3, 4, and 6-DOF motion systems available. Pivot type simulators generally are complicated devices with a large number of mechanical actuator components requiring extensive control systems because each movement requires a coordinated movement of all the actuators of the platform.

Bench type simulators are available in a variety of forms, with the most common being a row of seats which can move up and down, tilt from side to side, and tip toward the front or the back. In some variations, the individual seats have limited independent, synchronized shaking motion as well. Most bench type simulators have open seats with imagery projected onto a fixed screen in a theater type environment.

Sled type simulators come in a large variety of forms but all tend to move the passenger compartment by pitching, down on either side, and/or tipping, up or down in the front or back. Typically sled type simulators operate in a bowl, on a track or on a pivot point. These devices are the closest to the traditional amusement park or arcade rides and may or may not be combined with a imagery system as a part of the simulation.

There have also been designs for simulators based on suspending the passenger compartment from above, whereby actuators suspended from a frame support and control the movement of the passenger compartment. The inventors know of no production models or patents for this type of motion system simulator but believe such a design may exist.

The following patents describe inventions which constitute the most pertinent prior art that the applicant is aware of.

U.S. Pat. No. 4,066,256, which is hereby incorporated by reference in its entirety for the material that is disclosed therein, to Trumbull describes an amusement ride that uses three hydraulic rams that can tilt the passenger frame or move it up or down.

U.S. Pat. No. 4,251,140, which is hereby incorporated by reference in its entirety for the material that is disclosed therein, to Fogerty describes a ride assembly for simulating travel that uses carriage members to provide pitching and rolling, in limited degrees, to a passenger housing.

U.S. Pat. No. 4,303,236, which is hereby incorporated by reference in its entirety for the material that is disclosed therein, to Czarnecki describes a trip motion simulator which provides motion to a people-holding capsule by supporting the capsule on pitch and roll cradles, with the cradles themselves mounted on a platform that permits fore and aft as well as side to side motion.

U.S. Pat. No. 4,461,470, which is hereby incorporated by reference in its entirety for the material that is disclosed therein, to Astroth et al. describes a system for adding realism to video display which uses a platform mechanism to tilt the single passenger seat while moving the views on the video display accordingly.

U.S. Pat. No. 4,642,945, which is hereby incorporated by reference in its entirety for the material that is disclosed therein, to Browning et al. describes an entertainment structure in which the seats in an auditorium are tilted and rotated to enhance the visual presentation.

U.S. Pat. No. 4,710,128, which is hereby incorporated by reference in its entirety for the material that is disclosed therein, to Wachsmuth et al. describes a spatial disorientation trainer-flight simulator which uses a cockpit gimbaled on three independently controlled axes, ie., pitch, roll and yaw, revolving about a planetary axis.

U.S. Pat. No. 4,710,129, which is hereby incorporated by reference in its entirety for the material that is disclosed therein, to Newman et al. describes a simulation device in which a passenger cabin is mounted on a pivoting structure providing pivoting and pitching motion to the passenger, under passenger control as part of a video arcade game.

U.S. Pat. No. 4,856,771, which is hereby incorporated by reference in its entirety for the material that is disclosed therein, to Nelson et al. describes a video simulation apparatus. This machine has an enclosed cockpit containing movement controls and may be occupied by one or two persons.

U.S. Pat. No. 4,874,162, which is hereby incorporated by reference in its entirety for the material that is disclosed therein, to Trumbull et al. describes an amusement ride of the type that moves and tilts passengers viewing a motion picture.

U.S. Pat. No. 4,879,849, which is hereby incorporated by reference in its entirety for the material that is disclosed therein, to Hollingsworth III et al. describes a point of view motion simulator system to be used essentially for applying motion to seats within a motion picture theater.

U.S. Pat. No. 4,885,878, which is hereby incorporated by reference in its entirety for the material that is disclosed therein, to Wuu describes a movie theater where the seats are attached to a movable platform which provides tilting motion to participants of the ride.

U.S. Pat. No. 5,015,933, which is hereby incorporated by reference in its entirety for the material that is disclosed therein, to Watkins et al. describes a seat base motion controller for providing seat motion for seat motion systems used in amusement rides and the like.

U.S. Pat. No. 5,060,932, which is hereby incorporated by reference in its entirety for the material that is disclosed therein, to Yamaguchi describes an amusement apparatus based on a rotary capsule which holds one or two individuals and performs rotary motions.

U.S. Pat. No. 5,071,352, which is hereby incorporated by reference in its entirety for the material that is disclosed therein, to Denne describes a simulator mechanism that provides 6-degrees of freedom in motion.

U.S. Pat. No. 5,182,150, which is hereby incorporated by reference in its entirety for the material that is disclosed therein, to Carlos et al. describes a flight simulator utilizing a sphere assembly mounted on a pedestal. The sphere and pedestal are both moveable under the control of motion actuation.

U.S. Pat. No. 5,192,247, which is hereby incorporated by reference in its entirety for the material that is disclosed therein, to Barr et al. describes a ride attraction which provides motion for a number of vehicles within a large stationary domed projection screen.

U.S. Pat. No. 5,199,875, which is hereby incorporated by reference in its entirety for the material that is disclosed therein, to Trumbull describes a method for generating supplemental motion in simulator.

SUMMARY OF THE INVENTION

It is an object of this invention to provide an apparatus for the simulation of motion sensations to passengers. This invention achieves this object by using a motion support structure, attached to each end of a passenger-holding capsule, which is capable of inducing on the capsule motion forces moving the capsule forward and backward, laterally (side by side), up and down, and/or rotationally about both the length of the capsule and about the center of the capsule. This invention accomplishes control of the motion by control parameters being processed by an external processor.

It is an object of this invention to provide a motion simulator apparatus capable of full 360 degree rotations. It achieves this object through the innovative use of a central axis assembly connected to the motion support structure.

It is an object of this invention to provide a motion simulator apparatus which is easily transportable and requires little special expertise or effort to set-up and operate. It accomplishes this object by being generally self contained and by being designed to fit within the size constraints of commercial transportation.

It is an object of this invention to provide a motion simulator apparatus which can be used as an integral component in a complete entertainment simulator package, including film or video, display, sound and motion.

DETAILED DESCRIPTION OF THE INVENTION

This invention is a simulator system for use in providing motion sensations or cues to passengers as a part of a total sensory environment. Motion sensations or cues are defined as the sensory response in the human user to the feelings of motion, orientation, velocity and acceleration. The primary use for this invention is in entertainment, or ride, applications. However, other uses for this invention which should be included but not limited to include education, training and research. The preferred embodiment of this invention includes a passenger-holding capsule composed of a lightweight filament wound composite material (other materials which could be used include: fiberglass, aluminum, thermoplastic or any other material from which a suitable capsule could be made), a support structure for the capsule, a number of tracks along which the capsule moves, a number of actuators to provide force to the capsule or its support structure, and a control system to coordinate, manage and monitor the simulator operation.

Figure 1:
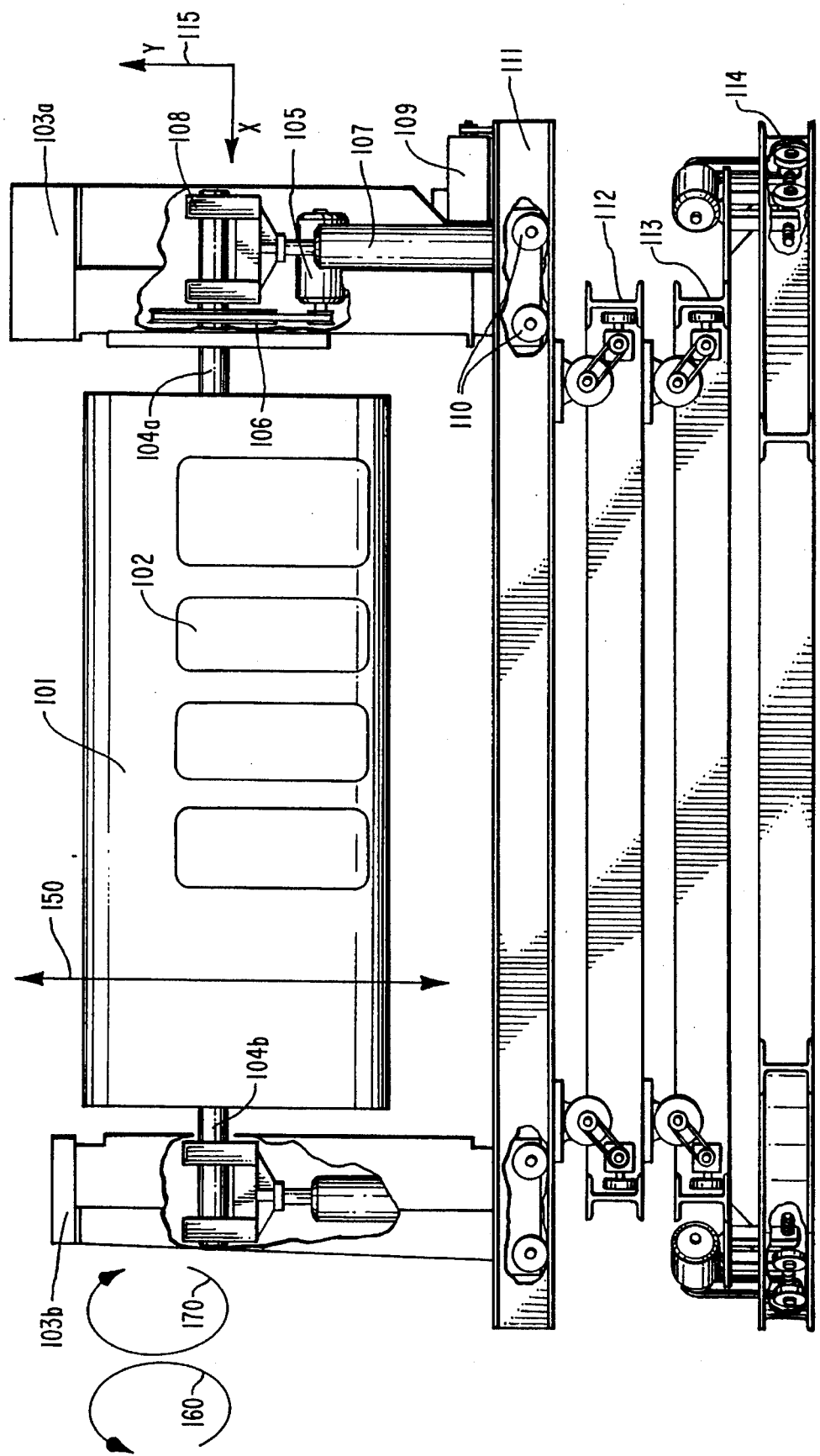
FIG. 1 depicts a side view of the simulator invention.

FIG. 1 shows the side view of the simulator invention, positioned in an imaginary x-y plane 115. The passenger-holding capsule 101 is shown suspended by a pair of spindles 104a and 104b and a pair of vertical supports 103a and 103b above a set of tracks, horizontal track 111, lateral track 112, single ended lateral track 113 and pivotal track 114. Along these tracks horizontal motion 260, lateral motion 250, single ended lateral motion 270 and pivotal motion 280 can occur. The types of motion created on these tracks are more particularly described in FIGS. 4, 5 and 6. Entrance and exit from the passenger-holding capsule 101 is provided via a series of doors 102 in each side of the capsule. Vertical motion of capsule 101 (either up or down) is indicated by an arrow 150 on FIG. 1. This vertical motion is enabled by activation of the vertical motor 201 turning the vertical belt 314 which is attached to the vertical ball screw 313 thereby applying vertical force to the cross piece of the support structure 315 which is attached to the spindle 104. The weight of the assembly is counterbalanced by pneumatic cylinders 107 contained within the vertical supports 103a and c. Rotational motion, shown in FIG. 1 by curved arrows 160 and 170, is enabled by use of the rotational motor 105 moving a drive belt 303 which in turn applies torque to a flywheel 106. The flywheel 106 transfers the torque through a rotational bearing 108 to the spindle 104 and from there to the passenger-holding capsule 101. Note that in this manner rotation can be continued indefinitely. Horizontal motion, shown in FIG. 2 by an arrow 260, is accomplished by activating horizontal motor 302 turning horizontal belt 312 which is attached to the horizontal ball screw 311 which in turn is connected to the under section of the support structure 103. Horizontal wheels 110 are also attached to the under section of the support structure 103. These wheels 110 ride on a horizontal track 111. In the preferred embodiment horizontal track 111 is of very limited length, short enough to fit within the limits of a standard cargo truck. This horizontal track 111 is designed to provide the means by which forward and backward motion is accomplished. Similarly, the lateral motion is accomplished by activating a set of linear motors 307a and 307b, one of which is positioned each side of the passenger-holding capsule 101. Each linear motor 307 turns a linear belt 316 which is attached to linear ball screw 317 thereby applying linear force to the support structure 103 and moving the capsule 101 side to side. Lateral wheels 304 are attached to the support structure 103 and are positioned on the lateral track 112. The lateral track 112 provides the means by which the entire passenger-holding capsule can be moved side to side. Single ended lateral motion (shown in FIG. 2 by arrow 270) is accomplished by movement of only one end of the passenger-holding capsule 101 along the second lateral track 113. This single ended lateral motion method, is also accomplished by the means of linear motors 308 which turns single ended lateral belt 318 which is attached to singled ended linear ball screw 319 thereby applying the single ended linear force to the support structure 103 and moving one end of capsule 101. Single ended lateral wheels 305 which are attached to the support structure 103 and positioned on the second lateral track 113. This single ended lateral motion provides the means for laterally shifting the front and the back of the passenger-holding capsule 101 independently. The pivotal motion (shown in FIG. 2 by an arrow 280) is driven is by linear motors 309 which turns pivot belt 320 which is attached to pivot ball screw 321 thereby applying the pivotal force to the support structure 103 and moving the capsule 101 about its center. Pivot wheels 306 which are attached to the support structure 103 and are positioned on the pivot track 114. This pivotal motion method provides the means to pivot the passenger-holding capsule 101 about its center. Each of the tracks 111, 112, 113, 114 are layered atop each other. Each of the tracks 111, 112, 113, 114 are, in the preferred embodiment, composed of a metal structure of two joined track structures. The preferred embodiment of the invention is configurable, enabling the combination of one or more of the motion means as necessary to simulate the required motion.

Figure 2:
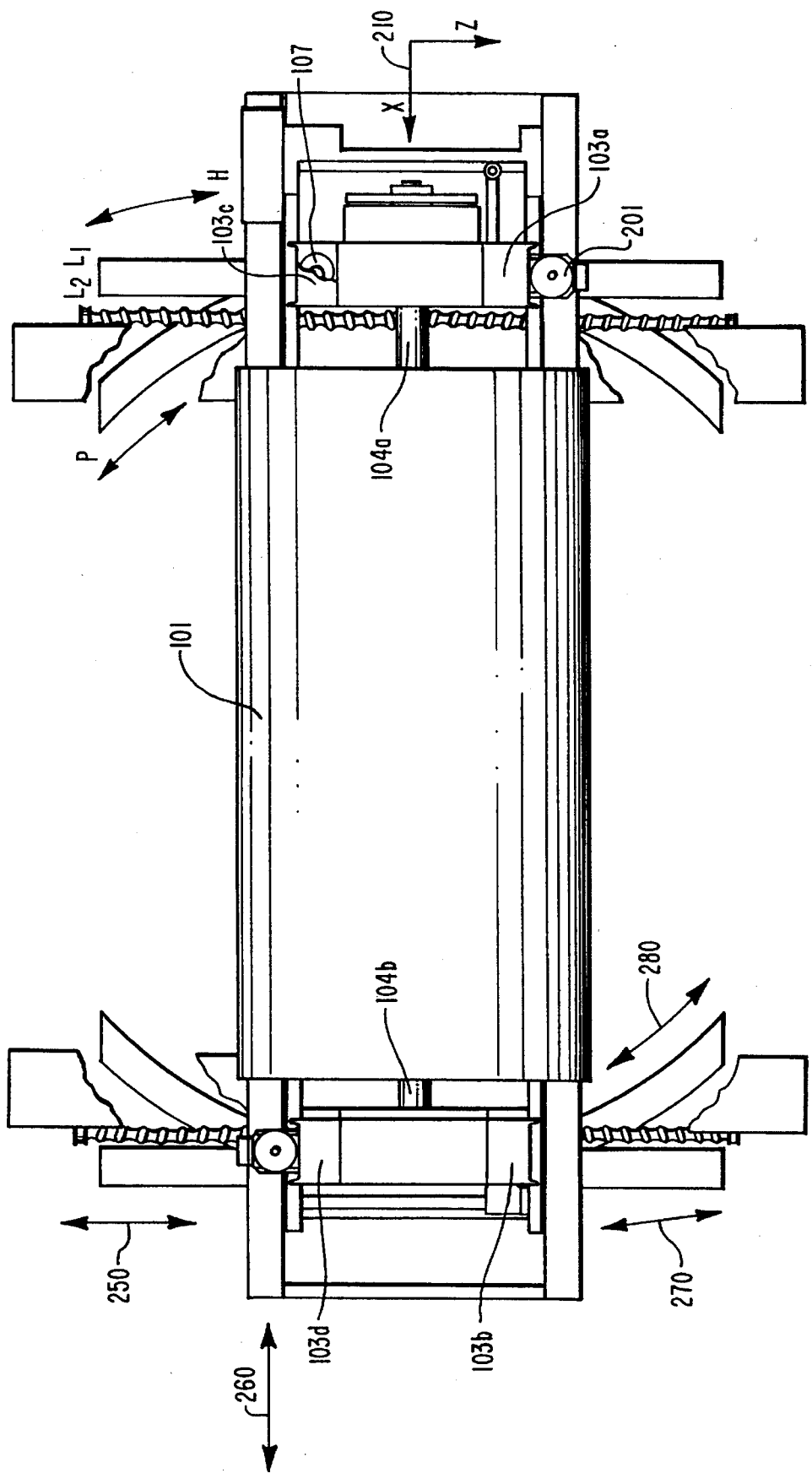
FIG. 2 depicts a top view of the simulator invention.

FIG. 2 shows a top view, in an imaginary x-z plane 210, of the simulator invention. In this view the passenger-holding capsule 101 is shown centered between each of the sets of tracks 111, 112, 113, 114 and in an upright position. The vertical motors 210 are shown connected to the vertical supports 103 to provide the necessary lift or release to the vertical motion.

Figure 3:
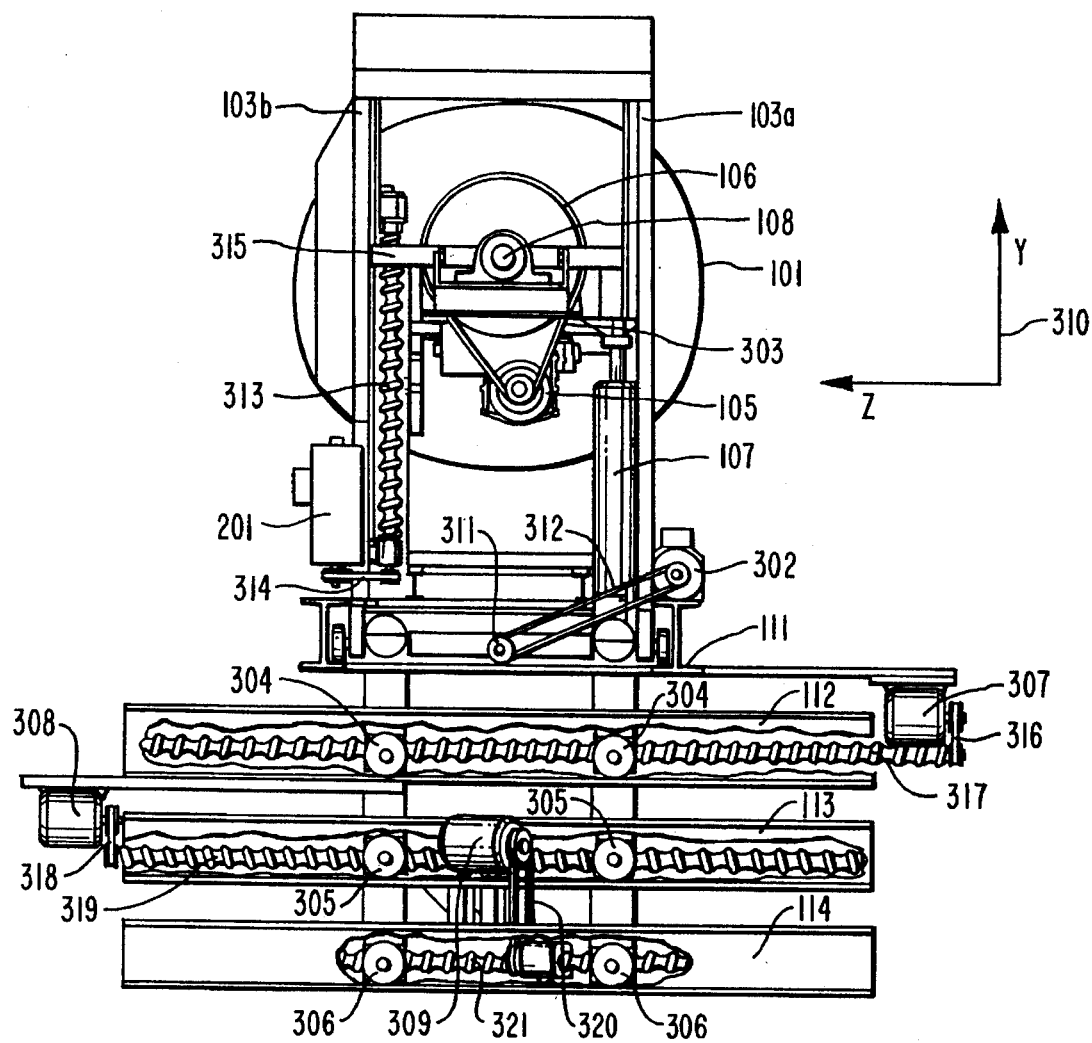
FIG. 3 depicts an end view of the simulator invention.

FIG. 3 shows an end view of the simulator invention. In this view the stacking of the motion tracks 111, 112, 113, 114 is shown. The linear motor 302 which drive the linear belt 312 which turns the linear ball screw 311 is shown. This drive mechanism used to transfer power from the linear motors 302 to the support structure 103. Linear wheels are 304 are shown riding on the linear track 112. The rotational motor 105 is shown connecting to the drive belt 303 which is in turn connected to the flywheel 106 which is in turn connected to the rotational bearings 108 which is in turn connected to the spindle 104 and which is connected to the passenger-holding capsule 101. In this manner the rotational motor 105 applies force turning the passenger-holding capsule. Complete rotations are possible in either direction upon command to the rotational motor 105.

Figure 4:
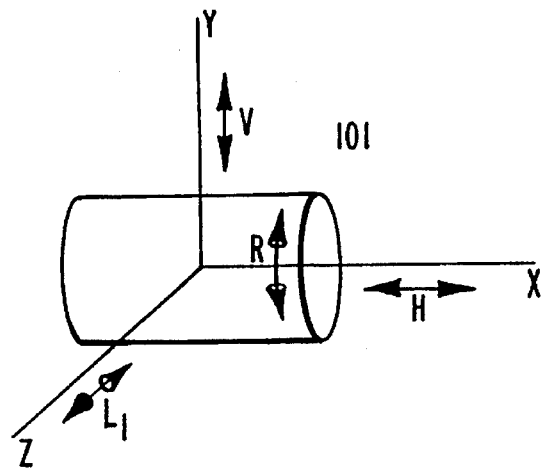
FIG. 4 depicts the passenger-holding capsule positioned on an x-y-z coordinate system to show the motions described as horizontal (H), vertical (V), rotational (R), and lateral one (L1).

FIG. 4 is a representation of the passenger-holding capsule 101 in three-space. X, Y, and Z represent the axis defining the three-space as shown in the figure. Vertical motion is shown as motion along or in parallel to the Y axis. Horizontal motion is shown as motion along or in parallel to the X axis. Linear motion is shown as motion along or in parallel to the Z axis. Rotational motion is shown as motion around an imaginary vector running through the center of the passenger-holding capsule 101 in either direction.

Figure 5:
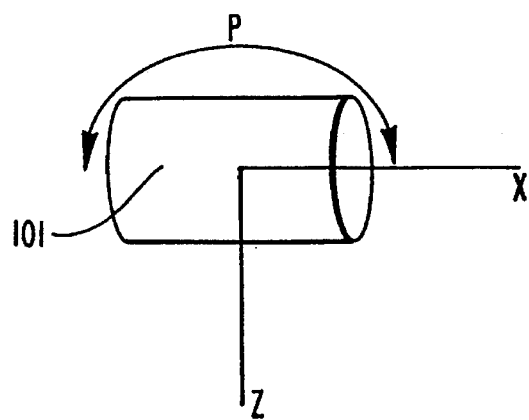
FIG. 5 depicts the passenger-holding capsule positioned in the x-z plane of an x-y-z coordinate system to show the motion described as pivotal (P).

FIG. 5 is a representation of the passenger-holding capsule 101 in the X-Z plane. Pivotal motion is show as motion rotating end-for-end about an imaginary center point in the passenger-holding capsule 101.

Figure 6:
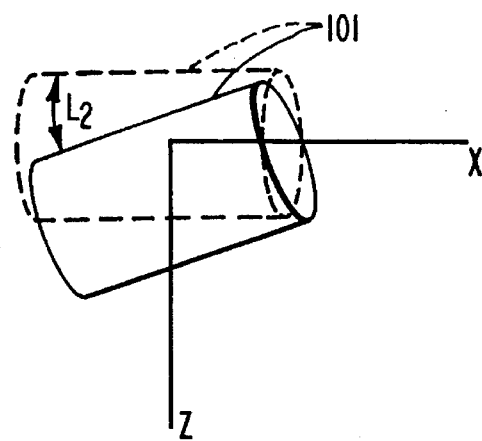
FIG. 6 depicts the passenger-holding capsule positioned in the x-z plane of an x-y-z coordinate system to show the motion described as lateral two (L2).

FIG. 6 is a representation of the passenger-holding capsule 101 in the X-Z plane. Single-ended lateral motion is shown as a rotation about an imaginary point in the center of either end of the passenger-holding capsule 101.

Figure 7:
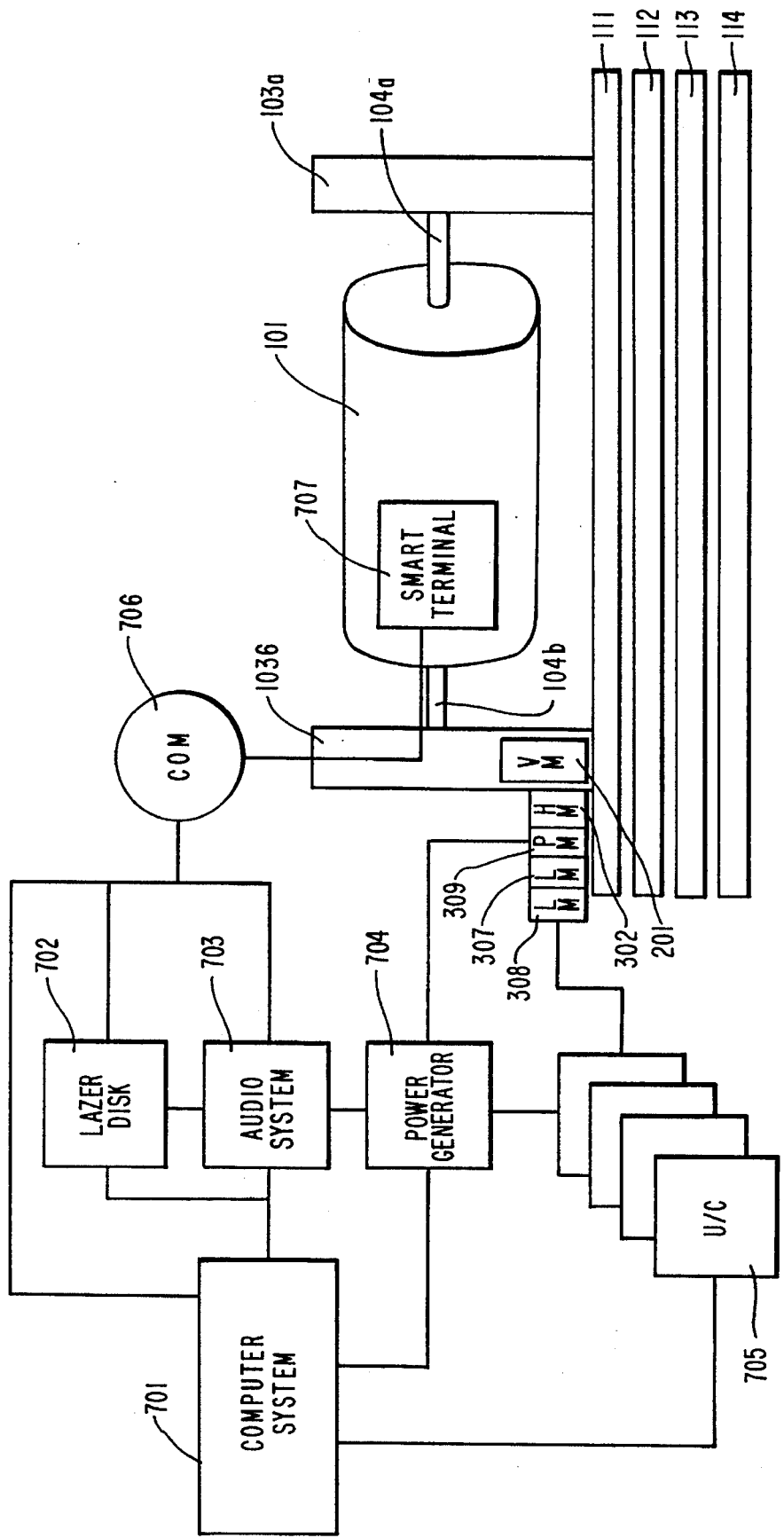
FIG. 7 depicts the system block diagram of the simulator invention.

FIG. 7 shows the block diagram of the system implementation of the simulator invention. A computer system 701 controls the operation of the simulator invention by performing a process of monitoring the position of the passenger-holding capsule 101 and applying control inputs to the motor controllers 705 which in turn activate the linear motors 302 thereby, adjusting the position of the passenger-holding capsule 101. The computer system 701 in the preferred embodiment is defined as a stand-alone processor with random access memory, hard disk permanent storage, a monitor, keyboard and mouse for user interface devices, and a modem for connection to remote computer systems for the purpose of transferring new simulation environment processes. Power is supplied to all components of the system through the use of a power generator 704. In the preferred embodiment, the computer system 701 also activates and controls a laser disk based video system 702, a audio system 703 and various safety devices, such as the entrances and exits 102, the weight distribution within the passenger-holding capsule 101 the fastening of user seat-belts, the monitor of fire/smoke alarms and air conditioning, as well as control and communication with a smart terminal 707 which is installed inside the passenger-holding capsule 101. All electronic communication to and from the interior of the passenger-holding capsule 101 pass through a commutator 706, which is designed to permit continuous connectivity between the interior and the exterior of the passenger-holding capsule without regard to the rotational state or movement of the capsule.

Figure 8:
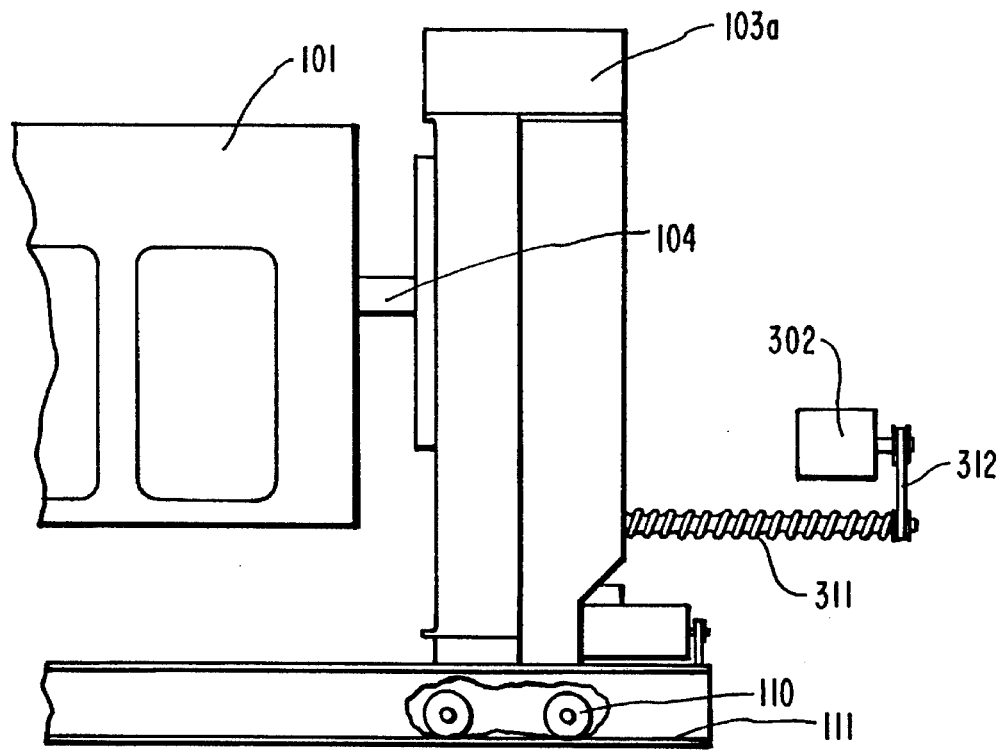
FIG. 8 depicts a view of the horizontal ball screw drive mechanism.

FIG. 8 further shows the ball screw mechanism as applied to horizontal movement. The horizontal motor 302 turns the horizontal belt 312, thereby turning the horizontal ball screw 311 and driving the support structure 103 along the horizontal tracks 111. Horizontal wheels 110 are used to reduce friction between the support structure 103 and the tracks 111. Lateral, single ended lateral and pivotal movements are accomplished in an identical manner with the only significant difference being that the track is positioned at a 90 degree angle from the horizontal track 111 for the lateral track 112 and the track is curved as shown in FIG. 2 for the single ended lateral track 113 and for the pivotal track 114.

Figure 9:
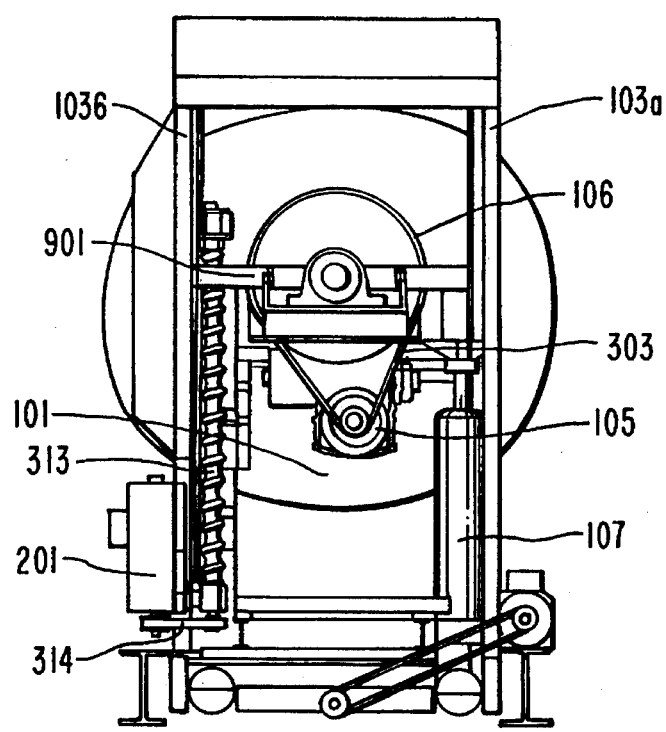
FIG. 9 depicts a view of the vertical ball screw drive mechanism and of the rotational flywheel drive mechanism.

FIG. 9 further shows the ball screw mechanism as applied to vertical movement. The vertical motor 201 driving the vertical belt 314, itself turning the vertical ball screw 313 which is attached to the cross piece of the support structure 901.

In the present preferred embodiment of this invention the passenger-holding capsule 101 is composed of a filament wound composite structure as is commonly understood in the filament winding structure art. The support structure 103 and the rails 111, 112, 113 and 114 are constructed of steel, formed, joined, finished and painted in accordance with standard commonly understood methods of metal work. The motors 105, 201, 302, 307, 308 and 309 are commercially available electric motors. The pneumatic cylinders and actuators 107 are also standard commercially available parts. The motor control units 705 are standard digital motor controllers. The computer system is a Pentium based microcomputer operating at 90 MHz with 32 MBytes of dynamic Random Access Memory, a 1.6 GByte hard disk, a floppy drive, a modem, monitor, keyboard and mouse. This computer system is a common commercially available system. The commutator is a commercially available component. A smart, or processor based, terminal 707 is included in the preferred embodiment of the invention. This terminal 707 is also a common commercially available computer interface.

The preferred control logic for managing the operation of the invention has been encoded into a computer program. This computer program runs on the computer system 701. Attached herein is the source code of the computer program which is an enabling example of the control process. This computer program serves to illustrate one way in which the method of the present control process can be implemented. It should be recognized that the process and the method of the present invention are not intended to be limited by the program listing included herein. This process could be implemented using virtually any other language.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent that they be deemed within the scope of our invention.

```
.list   +
.EXTERNAL IN,TIMER,RECD
.EXTERNAL _fp,_t1,_t2,_t3

.DEFINE PA=00H
.DEFINE PB=04H
.DEFINE PC=06H
.DEFINE PD=08H
.DEFINE PE=0AH
.DEFINE PG=02H

.DEFINE PTA=1000H
.DEFINE PTD=1008H
.DEFINE PTE=100AH
.DEFINE PTG=1002H
.DEFINE PTH=1060H
.DEFINE PTI=1800H

.DEFINE ENCL=5000H
.DEFINE ENCH=5800H          ;ENCODER INPUT PORTS
.DEFINE INFO=6000H
.DEFINE VELL=6800H
.DEFINE VELH=7000H          ;VELOCITY OUTPUT PORTS
.DEFINE COMP=7800H          ;COMPUTER INPUT PORT

.DEFINE TCNT=100EH          ;TIMER COUNTER
.DEFINE SCSR=2EH

;****************************************************
;EE STORAGE

.DEFINE MODE=2E00H          ;MODE STORAGE IN EEPROM

;****************************************************

.PSECT _zpage

RAMC:   .BYTE   [1]
RAMS:   .BYTE   [100]       ;SERIEL PORT BUFFER

_fp:    .BYTE   [4]
_t1:    .BYTE   [2]
_t2:    .BYTE   [2]
_t3:    .BYTE   [2]

M2:     .BYTE   [2]         ;USED IN MULT ROUTINE 16X16 AND 24X16
M1:     .BYTE   [2]
R2:     .BYTE   [2]
R1:     .BYTE   [2]
```

CES.S

```
N2:     .BYTE   [2]     ;USED IN DIV ROUTINE
N1:     .BYTE   [2]
D2:     .BYTE   [2]
D1:     .BYTE   [2]
DIVR:   .BYTE   [4]

G1:     .BYTE   [1]     ;ASCII STORAGE
G2:     .BYTE   [1]
G3:     .BYTE   [1]
G4:     .BYTE   [1]
G5:     .BYTE   [1]
G6:     .BYTE   [1]

T1:     .BYTE   [2]
T2:     .BYTE   [2]
T3:     .BYTE   [2]
T4:     .BYTE   [2]

TIMEL:  .BYTE   [2]     ;START TIME TOTALS
TIMEH:  .BYTE   [2]
TIMEB:  .BYTE   [2]     ;BEGIN START TIME
TIMEI:  .BYTE   [2]     ;TIME INC ON INTERRUPT

;****************************************************************

.psect  _text

;*****************************************************

IN:     LDS     #3FFH           ;STACK POINTER
        LDAA    #83H            ;ENABLE TIMER INTERRUPT AND
        STAA    1024H           ;PRESCALE OF 16 8USEC
        CLRA
        STAA    1035H           ;DISABLE BLOCK PROTECT
        LDAA    103FH           ;EEPROM AT 2000H
        CMPA    #2FH
        BEQ     INA             ;JMP IF CONTENTS OK

LDAA    #2FH
        STAA    M1
        LDY     #M1
        LDX     #103FH
        JSR     WRIT1
        JSR     WATCH

INA:    LDAA    #10H
        STAA    1035H           ;ENABLE PROTECT CONFIG
        LDX     #1000H          ;BASE ADDRESS
        LDAA    #05H
        STAA    5DH,X           ;ENABLE 32K EPROM
        LDAA    #00H
```

CES.S

```
          STAA    5EH,X           ;GCS NO VALID START ADDRESS

LDAA    #0FFH
          STAA    01H,X           ;PORT A OUTPUTS
          LDAA    #0F6H
          STAA    09H,X           ;PORT D OUTPUTS PD3,PD0 INPUTS
          BCLR    04H,PD,X        ;SET DTR ON SERIEL LINE
          BSET    20H,PD,X        ;SET PD5 HIGH FOR ENCODER LOAD

LDAA    #30H
          STAA    2BH,X           ;9600 BAUD

LDAA    #2CH
          STAA    2DH,X           ;ENABLE REC,TRAN AND REC INTERRUPT
          CLR     RAMC

LDY     #3
INB:      JSR     DLY100
          JSR     DLY100
          JSR     WATCH
          DEY
          BNE     INB

CLI

LDAA    #55H            ;TEST OUTPUT PORTS
          STAA    6400H
          LDAA    #0AAH
          STAA    6600H
          LDAA    #55H
          STAA    6800H
          LDAA    #0AAH
          STAA    6A00H

;****************************************************************

MAIN:     JSR     WATCH
          LDX     #1000H
          BCLR    01H,PA,X        ;
          BSET    01H,PA,X        ;SHOW IT IS ALIVE

LDAB    RAMS
          BEQ     MAIN            ;JMP IF RAMS IS 0
          CMPB    #55H
          BEQ     MAIN2
          CLR     RAMC
          CLR     RAMS
          JMP     MAIN
```

CES.S

```
MAIN2:  LDAB    RAMC
        CMPB    #9
        BCS     MAIN1
        JSR     GETD    ;GET DATA

MAIN1:  JMP     MAIN

;************************************************************
;GET DATA

GETD:   LDAB    RAMS+1
        CMPB    RAMS+2
        BNE     GETD4
GETD1:  LDAB    RAMS+3
        CMPB    RAMS+4
        BNE     GETD4
GETD2:  LDAB    RAMS+5
        CMPB    RAMS+6
        BNE     GETD4
GETD3:  LDAB    RAMS+7
        CMPB    RAMS+8
        BNE     GETD4

LDAB    RAMS+1
        STAB    6400H   ;SEND TO LEDS1
        LDAB    RAMS+3
        STAB    6600H   ;SEND TO LEDS2
        LDAB    RAMS+5
        STAB    6800H   ;SEND TO FANS, DOORS, AIR, LIGHTS
        LDAB    RAMS+7
        STAB    6A00H   ;SEND TO EXTRA OUTPUT PORT

GETD4:  CLR     RAMC
        CLR     RAMS

LDAB    #0AAH
        JSR     TRAN    ;COMMAND FOR START SENDING INPUTS

LDAB    7000H
        JSR     TRAN    ;SEND BELTS1 INPUTS
        LDAB    7200H
        JSR     TRAN    ;SEND BELTS2 INPUTS
        LDAB    7400H
        JSR     TRAN    ;SEND SEATS1
        LDAB    7600H
        JSR     TRAN    ;SEND SEATS2
        LDAB    7800H
        JSR     TRAN    ;SEND INTER1
        LDAB    7A00H
        JSR     TRAN    ;SEND INTER2
```

CES.S

```
        LDAB    7C00H
        JSR     TRAN    ;SEND INTER3
        LDAB    7E00H
        JSR     TRAN    ;SEND INTER4
        LDAB    6000H
        JSR     TRAN    ;SEND FIRE
        LDAB    6200H
        JSR     TRAN    ;SEND EXTRA

LDAB    7000H
        JSR     TRAN    ;SEND BELTS1 INPUTS
        LDAB    7200H
        JSR     TRAN    ;SEND BELTS2 INPUTS
        LDAB    7400H
        JSR     TRAN    ;SEND SEATS1
        LDAB    7600H
        JSR     TRAN    ;SEND SEATS2
        LDAB    7800H
        JSR     TRAN    ;SEND INTER1
        LDAB    7A00H
        JSR     TRAN    ;SEND INTER2
        LDAB    7C00H
        JSR     TRAN    ;SEND INTER3
        LDAB    7E00H
        JSR     TRAN    ;SEND INTER4
        LDAB    6000H
        JSR     TRAN    ;SEND FIRE
        LDAB    6200H
        JSR     TRAN    ;SEND EXTRA

RTS

;****************************************************
;TIMER OVERFLOW INTERRUPT

TIMER:  LDAA    #80H
        STAA    1025H   ;RESET TIMER OVERFLOW FLAG
        LDD     TIMEI
        ADDD    #1
        STD     TIMEI
TIMEE:  RTI

;****************************************************************

WATCH:  PSHX
        LDX     #1000H
        BCLR    10H,PD,X
        BSET    10H,PD,X
        PULX
        RTS
```

CES.S

```
;****************************************************************
;1 MSEC DELAY

DLY1:   PSHX
        LDX     #329    ;333 * 3 USEC = 1 MSEC
DLY2:   DEX             ;1.5 USEC
        BNE     DLY2    ;1.5 USEC
        PULX
        RTS

;5 MSEC DELAY

DLY5:   PSHX
        LDX     #1663   ;1666 * 3 USEC = 5 MSEC
DLY6:   DEX
        BNE     DLY6
        PULX
        RTS

;8.33 MSEC DELAY

DLY833: PSHX
        LDX     #2774   ;2777 * 3 USEC = 8.33 MSEC
DLY833B: DEX
        BNE     DLY833B
        PULX
        RTS

;10 MSEC DELAY

DLY10:  PSHX
        LDX     #3329   ;3333 * 3 USEC = 10 MSEC
DLY11:  DEX
        BNE     DLY11
        PULX
        RTS

;20 MSEC DELAY

DLY20:  PSHX
        LDX     #6661   ;6666 * 3 USEC = 20 MSEC
DLY21:  DEX
        BNE     DLY21
        PULX
        RTS

;50 MSEC DELAY

DLY50:  PSHX
        LDX     #16661  ;16666 * 3 USEC = 50 MSEC
```

CES.S

```
DLY51:  DEX
        BNE     DLY51
        PULX
        RTS

;100 MSEC DELAY

DLY100: PSHX
        LDX     #33329  ;33333 * 3 USEC = 100 MSEC
DLY101: DEX
        BNE     DLY101
        PULX
        RTS

;****************************************************************
;16 X 16 MULTIPLY M1 * M2 = R2 R1   R2 HI WORD R1 LO WORD

XMUL:   PSHA
        PSHB

LDD     #0
        STD     R2
        LDAA    M1+1
        LDAB    M2+1
        MUL
        STD     R1
        LDAA    M1+1
        LDAB    M2
        MUL
        ADDD    R2+1
        STD     R2+1
        BCC     XMU10
        INC     R2
XMU10:  LDAA    M1
        LDAB    M2+1
        MUL
        ADDD    R2+1
        STD     R2+1
        BCC     XMU20
        INC     R2
XMU20:  LDAA    M1
        LDAB    M2
        MUL
        ADDD    R2
        STD     R2
XMU50:
        PULB
        PULA
        RTS

;*********************************************
```

CES.S

```
;TRANSMIT BYTE IN B ACCUMULATOR

TRAN:   LDX     #1000H
TRAN3:  BRCLR   TRAN3,80H,SCSR,X
        STAB    102FH           ;SEND DATA
        RTS

;*********************************************
;RECEIVE INTERRUPT ROUTINE

RECD:   LDX     #1000H
RECD2:  BRCLR   RECD2,20H,SCSR,X        ;JMP TO SELF UNTIL BUFFER
FULL
        LDAB    RAMC
        CLRA
        XGDY                    ;LOAD Y INDEX BASED ON RAMC
        LDAB    102FH           ;GET BYTE
        STAB    RAMS,Y          ;STORE BYTE
        INC     RAMC
        LDAB    RAMC
        CMPB    #20
        BCS     RECD1           ;JMP IF RAMC > 9
        CLR     RAMC
RECD1:  RTI

;***********************************************************
; WRITE TO EEPROM MEMEORY
; X CONTAINS ADDRESS TO WRITE TO Y CONTAINS DATA ADDRESS
; WRITE ONE BYTE

WRIT1:  NOP
        LDAB    #16H
        JSR     PROG
        LDAB    #02H
        JSR     PROG
        RTS

;*************************************************
; WRITE TO EEPROM MEMEORY
; X CONTAINS ADDRESS TO WRITE TO Y CONTAINS DATA ADDRESS
; WRITE DOUBLE BYTE

WRITE:  LDD     0,X
        CPD     0,Y
        BEQ     WRITD
        SEI
        JSR     ERASE
        JSR     WRITEE
        CLI
WRITD:  RTS
```

CES.S

```
ERASE:   NOP
         LDAB    #16H
         JSR     PROG
         INX
         LDAB    #16H
         JSR     PROG
         DEX
         RTS

WRITEE:  LDAB    #02H
         JSR     PROG
         INX
         INY
         LDAB    #02H
         JSR     PROG
         RTS

;**********************************
;USED FOR BOTH ERASING AND WRITING

PROG:    STAB    103BH
         LDAA    0,Y
         STAA    0,X
         INC     103BH
         JSR     DLY10    ;10 MSEC DELAY
         DEC     103BH
         CLR     103BH
         RTS

.END
```

FORM1.FRM - 1

```
Sub delay ()
time1 = Time
Do
time2 = Time
Loop While time2 - time1 < .01

End Sub

Sub docom ()

padd = fval(1) 'address

If fval(3) = 1 Then Call motor1
If fval(3) = 2 Then Call laser1
If fval(3) = 9 Then
    If fval(4) = 1 Then out1(3) = out1(3) Or &H1 'turn on lights
    If fval(4) = 2 Then out1(3) = out1(3) And &HFE 'turn off lights
    If fval(4) = 13 Then out1(3) = out1(3) And &H40 'turn on fan1
    If fval(4) = 14 Then out1(3) = out1(3) And &HBF 'turn off fan1
    If fval(4) = 15 Then out1(3) = out1(3) And &H80 'turn on fan2
    If fval(4) = 16 Then out1(3) = out1(3) And &H7F 'turn off fan2
End If End Sub Sub drawc ()

'in1(1) = &H55
'in1(2) = &HAA
'in1(3) = &H0
'in1(4) = &H55 picture1.FillStyle = 0 'solid
clr = RGB(0, 0, 0)'black

For j = 1 To 4
picture1.CurrentY = 10 + j * 40
picture1.CurrentX = 20
For i = 1 To 4 picture1.FillColor = RGB(255, 255, 255)'white
k = i + (j - 1) * 4
Select Case k
Case 1
    If (in1(3) And &H1) > 0 Then
    picture1.FillColor = RGB(255, 0, 0)'red
    End If
    If (in1(1) And &H1) > 0 Then
    picture1.FillColor = RGB(0, 255, 0)'green
    End If
Case 2
    If (in1(3) And &H2) > 0 Then
    picture1.FillColor = RGB(255, 0, 0)'red
    End If
    If (in1(1) And &H2) > 0 Then
    picture1.FillColor = RGB(0, 255, 0)'green
    End If
```

```
Case 3
    If (in1(3) And &H4) > 0 Then
    picture1.FillColor = RGB(255, 0, 0)'red
    End If
    If (in1(1) And &H4) > 0 Then
    picture1.FillColor = RGB(0, 255, 0)'green
    End If
Case 4
    If (in1(3) And &H8) > 0 Then
    picture1.FillColor = RGB(255, 0, 0)'red
    End If
    If (in1(1) And &H8) > 0 Then
    picture1.FillColor = RGB(0, 255, 0)'green
    End If
Case 5
    If (in1(3) And &H10) > 0 Then
    picture1.FillColor = RGB(255, 0, 0)'red
    End If
    If (in1(1) And &H10) > 0 Then
    picture1.FillColor = RGB(0, 255, 0)'green
    End If
Case 6
    If (in1(3) And &H20) > 0 Then
    picture1.FillColor = RGB(255, 0, 0)'red
    End If
    If (in1(1) And &H20) > 0 Then
    picture1.FillColor = RGB(0, 255, 0)'green
    End If
Case 7
    If (in1(3) And &H40) > 0 Then
    picture1.FillColor = RGB(255, 0, 0)'red
    End If
    If (in1(1) And &H40) > 0 Then
    picture1.FillColor = RGB(0, 255, 0)'green
    End If
Case 8
    If (in1(3) And &H80) > 0 Then
    picture1.FillColor = RGB(255, 0, 0)'red
    End If
    If (in1(1) And &H80) > 0 Then
    picture1.FillColor = RGB(0, 255, 0)'green
    End If
Case 9
    If (in1(4) And &H1) > 0 Then
    picture1.FillColor = RGB(255, 0, 0)'red
    End If
    If (in1(2) And &H1) > 0 Then
    picture1.FillColor = RGB(0, 255, 0)'green
    End If
Case 10
    If (in1(4) And &H2) > 0 Then
    picture1.FillColor = RGB(255, 0, 0)'red
    End If
    If (in1(2) And &H2) > 0 Then
    picture1.FillColor = RGB(0, 255, 0)'green
    End If
Case 11
    If (in1(4) And &H4) > 0 Then
    picture1.FillColor = RGB(255, 0, 0)'red
    End If
    If (in1(2) And &H4) > 0 Then
```

```
                                    RGB
        picture1.FillColor =    ,(0, 255, 0)'green
        End If                 ^
Case 12
    If (in1(4) And &H8) > 0 Then
        picture1.FillColor = RGB(255, 0, 0)'red
    End If
    If (in1(2) And &H8) > 0 Then
        picture1.FillColor = RGB(0, 255, 0)'green
    End If
Case 13
    If (in1(4) And &H10) > 0 Then
        picture1.FillColor = RGB(255, 0, 0)'red
    End If
    If (in1(2) And &H10) > 0 Then
        picture1.FillColor = RGB(0, 255, 0)'green
    End If
Case 14
    If (in1(4) And &H20) > 0 Then
        picture1.FillColor = RGB(255, 0, 0)'red
    End If
    If (in1(2) And &H20) > 0 Then
        picture1.FillColor = RGB(0, 255, 0)'green
    End If
Case 15
    If (in1(4) And &H40) > 0 Then
        picture1.FillColor = RGB(255, 0, 0)'red
    End If
    If (in1(2) And &H40) > 0 Then
        picture1.FillColor = RGB(0, 255, 0)'green
    End If
Case 16
    If (in1(4) And &H80) > 0 Then
        picture1.FillColor = RGB(255, 0, 0)'red
    End If
    If (in1(2) And &H80) > 0 Then
        picture1.FillColor = RGB(0, 255, 0)'green
    End If
End Select picture1.Circle Step(20, 0), 5, clr Next i
Next j End Sub Sub drawp ()
picture1.Cls
picture1.FontBold = True
picture1.FontName = "arial"
picture1.FontSize = 12
clr = RGB(0, 0, 0)'black
picture1.DrawWidth = 2
picture1.ForeColor = RGB(0, 0, 0)

picture1.Line (20, 20)-(120, 190), clr, B
picture1.DrawWidth = 1 picture1.CurrentY = 6
picture1.CurrentX = 50
picture1.Print "SEATS"
```

```
For j = 1 To 4
For i = 1 To 4
picture1.CurrentY = j * 40 - 7
k = Str$(i + (j - 1) * 4)
If k < 10 Then
picture1.CurrentX = 13 + i * 20
Else
picture1.CurrentX = 8 + i * 20
End If
picture1.Print Str$(i + (j - 1) * 4)
Next i
Next j Call drawc picture1.FillStyle = 0  'solid
clr = RGB(0, 0, 0) 'black
picture1.FillColor = RGB(255, 255, 255) 'white
picture1.Circle (40, 200), 5, clr
picture1.CurrentY = 193
picture1.CurrentX = 55
picture1.Print "Vacant"

picture1.FillColor = RGB(255, 0, 0) 'white
picture1.Circle (40, 220), 5, clr
picture1.CurrentY = 213
picture1.CurrentX = 55
picture1.Print "Occupied"

picture1.FillColor = RGB(0, 255, 0) 'white
picture1.Circle (40, 240), 5, clr
picture1.CurrentY = 233
picture1.CurrentX = 55
picture1.Print "Belts On"

End Sub

Sub estopoff1 ()
paddp = padd
padd = 1
sdata = 13  'estop off
Call datain
padd = paddp End Sub Sub estopon1 ()
paddp = padd
padd = 1
sdata = 12  'engage estop
Call datain
padd = paddp End Sub Sub home1 ()
paddp = padd
padd = 0
```

```
sdata = 14    'do home posi    n
Call datain              ^position
padd = 1
sdata = 14    'do home position
Call datain
padd = 2
sdata = 14    'do home position
Call datain
padd = 3
sdata = 14    'do home position
Call datain
padd = paddp
End Sub Sub input1 ()
If errorc = 1 Then Exit Sub sdata = 10 'command byte get 10 input bytes
paddp = padd
padd = 0

Call datain
'd1 = bits1 'echo back command byte

'Call datain
in1(1) = bits1
Call datain
in1(2) = bits1
Call datain
in1(3) = bits1
Call datain
in1(4) = bits1
Call datain
in1(5) = bits1
Call datain
in1(6) = bits1
Call datain
in1(7) = bits1
Call datain
in1(8) = bits1
Call datain
in1(9) = bits1
Call datain
in1(10) = bits1
padd = paddp End Sub Sub laser1 ()
If errorc = 1 Then Exit Sub Dim d4 As Long
Dim d3 As Long
Dim d2 As Long
Dim d1 As Long t = fval(2)    'seconds
x = t / .000008
d4 = x \ (256 ^ 3)
d3 = (x - (d4 * 256 ^ 3)) \ (256 ^ 2)
```

```
d2 = (x - (d4 * 256 ^ 3)   d3 * 256 ^ 2)) \ 256
d1 = x - (d4 * 256 ^ 3) - (d3 * 256 ^ 2) - d2 * 256 sdata = 2
Call datain
sdata = d2
Call datain
sdata = d1
Call datain
sdata = d3
Call datain
sdata = d4
Call datain x = fval(4)  'frame number for laser player
d4 = x \ (256 ^ 3)
d3 = (x - (d4 * 256 ^ 3)) \ (256 ^ 2)
d2 = (x - (d4 * 256 ^ 3) - (d3 * 256 ^ 2)) \ 256
d1 = x - (d4 * 256 ^ 3) - (d3 * 256 ^ 2) - d2 * 256 sdata = d1    'position low byte
Call datain
sdata = d2    'position med byte
Call datain
sdata = d3    'position high byte
Call datain
sdata = 0     'padding
Call datain
sdata = 0     'padding
Call datain End Sub Sub motor1 ()
If errorc = 1 Then Exit Sub Dim d4 As Long
Dim d3 As Long
Dim d2 As Long
Dim d1 As Long t = fval(2)    'seconds x = t / .000008
d4 = x \ (256 ^ 3)
d3 = (x - (d4 * 256 ^ 3)) \ (256 ^ 2)
d2 = (x - (d4 * 256 ^ 3) - (d3 * 256 ^ 2)) \ 256
d1 = x - (d4 * 256 ^ 3) - (d3 * 256 ^ 2) - d2 * 256 sdata = 1     'motor command
Call datain
If sdata <> bits1 Then
sdata = bits1
End If sdata = d2
Call datain
If sdata <> bits1 Then
sdata = bits1
End If
```

```
sdata = d1
Call datain
If sdata <> bits1 Then
sdata = bits1
End If sdata = d3
Call datain
If sdata <> bits1 Then
sdata = bits1
End If sdata = d4
Call datain
If sdata <> bits1 Then
sdata = bits1
End If x = fval(4) 'position for motor in encoder counts
d4 = x \ (256 ^ 3)
d3 = (x - (d4 * 256 ^ 3)) \ (256 ^ 2)
d2 = (x - (d4 * 256 ^ 3) - (d3 * 256 ^ 2)) \ 256
d1 = x - (d4 * 256 ^ 3) - (d3 * 256 ^ 2) - d2 * 256 sdata = d1      'position low byte
Call datain
sdata = d2      'position med byte
Call datain x = fval(5) 'speed of motor
d4 = x \ 256
d3 = x - (d4 * 256)

sdata = d3      'speed low byte
Call datain
sdata = d4      'speed high byte
Call datain sdata = fval(6) 'ramp
Call datain End Sub Sub outport1 ()
If errorc = 1 Then Exit Sub paddp = padd
padd = 0 sdata = 9       'send 4 bytes to output ports on smart ter
Call datain
sdata = out1(1)
Call datain
sdata = out1(2)
Call datain
sdata = out1(3)
Call datain
sdata = out1(4)
Call datain
padd = paddp
```

```
't1 = Timer
'Do
't2 = Timer
'Loop While (t2 - t1) < .1
'text2.Text = (t2 - t1)

End Sub

Sub roll ()

If addressm = 3 Then
paddp = padd
padd = 3      'motor 4 controls rolling motion
sdata = 15    'number of rolls
Call datain
sdata = Val(roll1.Text)
Call datain
padd = paddp
End If End Sub Sub stime_Click ()
Call stime1

End Sub

Sub timeslot ()

filep = 0 'file pointer which is lowest
fval(2) = 1000000#

If fmot1(m1p, 3) <> 8 Then
If fmot1(m1p, 2) < fval(2) Then
For i = 1 To 6
fval(i) = fmot1(m1p, i)
Next i
filep = 1
End If
End If If fmot2(m2p, 3) <> 8 Then
If fmot2(m2p, 2) < fval(2) Then
For i = 1 To 6
fval(i) = fmot2(m2p, i)
Next i
filep = 2
End If
End If If fmot3(m3p, 3) <> 8 Then
If fmot3(m3p, 2) < fval(2) Then
For i = 1 To 6
fval(i) = fmot3(m3p, i)
Next i
filep = 3
End If
End If
```

```
If fmot4(m4p, 3) <> 8 Then
If fmot4(m4p, 2) < fval(2) Then
For i = 1 To 6
fval(i) = fmot4(m4p, i)
Next i
filep = 4
End If
End If If filep = 0 Then 'program over
timeb = 0
m1p = 1: m2p = 1: m3p = 1: m4p = 1
'sdata = 7
'Call datain      'send stop command
'Call startmovie
End If Select Case filep
Case 0
Case 1
    m1p = m1p + 1
Case 2
    m2p = m2p + 1
Case 3
    m3p = m3p + 1
Case 4
    m4p = m4p + 1
End Select padd = fval(1)

End Sub

Sub edit_Click ()
Call openedit

End Sub

Sub encoder_Click ()
Call encoder1
End Sub

Sub estopoff_Click ()
Call estopoff1
End Sub

Sub estopon_Click ()
Call estopon1
End Sub

Sub exit1_Click ()
End
End Sub

Sub File0_Click ()
Call openf

End Sub
```

```
Sub Form_KeyDown (Keycode As Integer, Shift As Integer)

'f1=112 f2=113 f3=114 etc.

If Keycode = 112 Then
Call startmovie
End If

If Keycode = 113 Then
Call stopmovie
End If

End Sub

Sub Form_Load ()

timeb = 0
padd = 0
'datap = 956 'for 486
datap = 888 'for 586
statp = datap + 1
commp = datap + 2 'init parrelle port address
Call agOutp(commp, 0)

out1(1) = 0 'leds1 off
out1(2) = 0 'leds2 off
out1(3) = &H18 'air lights on
out1(4) = 0   'extra port off
'Call outport1 'send out output ports
'Call input1 'get input ports
Call drawp End Sub Sub home_Click ()
Call home1

End Sub

Sub laser_Click ()
paddp = padd
padd = 3 fval(2) = 0 'time = 0 execute immediate
fval(4) = frame.Text
Call laser1
padd = paddp End Sub Sub motor_Click ()

padd = addressm.Text

'Call roll
fval(2) = 0'time = 0 execute immediate
fval(4) = position.Text
fval(5) = speedm.Text
fval(6) = ramp.Text
```

```
Call motor1
End Sub

Sub que_Click ()
Call que1
End Sub

Sub Start_Click ()
Call startmovie

End Sub

Sub Stop_Click ()
Call stopmovie

End Sub

Sub Timer1_Timer ()

If stopf = 1 Then
Check1.Value = 0
time5 = Timer
If (time5 - time6) > .5 Then
time6 = time5
Call writef
End If
End If If timeb > 0 Then
'Check2.Value = 1
time1 = Timer
timet = time1 - timeb
timem.Text = timet If flagc = 0 Then
Call timeslot   'get next command in fval based on time
flagc = 1
End If If (fval(2) - timet) < 2 Then
Call docom
flagc = 0
End If End If If Check1.Value = 1 Then
time7 = Timer
If (time7 - time8) > .5 Then
time8 = time7
padd = addressi.Text
Call speedd
Call encoder1
Call stime1
Call que1
End If
End If
```

```
If Check2.Value = 1 Then
time3 = Timer
If (time3 - time4) > .25 Then
time4 = time3
If incb > 10000 Then
incb = 0
End If
out1(1) = 0
out1(2) = incb And &HFF
out1(3) = 0
out1(4) = 0
If (togg = 1) Then
Call outport1    'send output port bytes to smart terminal
togg = 0
Else
incb = incb + 1
Call input1   'get 10 input port bytes
Call drawc
togg = 1
End If
End If
End If If errorc = 1 Then
errorc = 0
End If End Sub
```

```
Declare Function agInp% Lib "Apiguide.dll" (ByVal port  tid%)
Declare Sub agOutp Lib "Apiguide.dll" (ByVal portid%, ByVal outval%)
Global parc As Integer   'parrelle port command byte
Global pars As Integer   'parrelle port status byte
Global padd As Integer   'parrelle port address byte
Global time1 As Single
Global time2 As Single
Global time4 As Single
Global time6 As Single
Global time8 As Single
Global timeot As Single
Global datap As Integer  'data out port for parrelle port
Global statp As Integer  'data input port for parrelle port
Global commp As Integer  'command port for parrelle port Global bits1
Global sdata    'data to send Global fin As String 'holds data file
Global fmot1(1 To 1000, 1 To 6) As Single 'motor 1 values
Global fmot2(1 To 1000, 1 To 6) As Single 'motor 2 values
Global fmot3(1 To 1000, 1 To 6) As Single 'motor 3 values
Global fmot4(1 To 1000, 1 To 6) As Single 'motor 4 values
Global fval(1 To 6) As Single 'general location for file values
Global m1p As Integer 'points to line in file
Global m2p As Integer 'points to line in file
Global m3p As Integer 'points to line in file
Global m4p As Integer 'points to line in file
Global errorc As Integer 'error in comm line
Global timeb As Long 'begin time at start
Global flagc As Integer 'flag to get next command
Global incb As Integer 'increment bit for testing
Global speed As Integer 'contains 8 bit speed from motor controller
Global stopf As Integer 'stop flag for writing file
Global encod As Long 'encoder count
'Global encodf As Long 'encoder count future Global out1(1 To 4) As Integer 'output ports on smart terminal
Global in1(1 To 10) As Integer 'input ports from smart terminal
Global togg As Integer Sub commerror ()
If (time2 - time1) > .1 Then
parc = parc And &HE
Call agOutp(commp, parc) 'strobe high
title = "Comm Error on Address " + Str(padd)
MsgBox (title)
timeb = 0
form1.Check1.Value = 0
form1.Check2.Value = 0
errorc = 1
End If
End Sub Sub datain ()

bits1 = 0
If errorc = 1 Then Exit Sub
```

```
If padd = 0 Then parc = &     'motor 1   smart terminal
If padd = 1 Then parc = &H8 'motor 2
If padd = 2 Then parc = &HE 'motor 3
If padd = 3 Then parc = &HC 'motor 4   laser player
errorc = 0

Call agOutp(commp, parc) 'put out address parc = parc Or &H1    'clear strobe line
Call agOutp(datap, sdata) 'command
Call agOutp(datap, sdata) 'command
Call agOutp(commp, parc) 'strobe low time1 = Timer
Do
stat = &H80 And agInp(statp)
time2 = Timer
Loop While stat = &H0 And (time2 - time1) < .1
Call commerror
If errorc = 1 Then Exit Sub a1 = agInp(statp) 'get lower 4 bits
a1 = a1 And &H78
a1 = a1 \ 8
parc = parc And &HE
Call agOutp(commp, parc) 'strobe high time1 = Timer
Do
stat = &H80 And agInp(statp)
time2 = Timer
Loop While stat = &H80 And (time2 - time1) < .1
Call commerror
If errorc = 1 Then Exit Sub parc = parc Or &H1
Call agOutp(commp, parc) 'strobe low time1 = Timer
Do
stat = &H80 And agInp(statp)
time2 = Timer
Loop While stat = &H0 And (time2 - time1) < .1
Call commerror
If errorc = 1 Then Exit Sub a2 = 2 * agInp(statp) 'get upper 4 bits
a2 = a2 And &HF0
parc = parc And &HE
Call agOutp(commp, parc) 'strobe high
bits1 = a1 + a2 time1 = Timer
Do
stat = &H80 And agInp(statp)
time2 = Timer
Loop While stat = &H80 And (time2 - time1) < .1
Call commerror
If errorc = 1 Then Exit Sub
```

```
End Sub

Sub encoder1 ()
If errorc = 1 Then Exit Sub paddp = padd
padd = form1.addressi.Text
sdata = 5 'command byte
Call datain
d1 = bits1
Call datain
d2 = bits1
encod = d1 + 256 * d2
form1.encoder.Text = encod
padd = paddp End Sub Sub linep ()

spont = InStr(1, fin, ",")
spont = spont + 1
epont = spont

For y = 1 To 6
    epont = InStr(epont + 1, fin, ",")
    If epont = 0 Then Exit For
    fval(y) = Val(Mid$(fin, spont, epont - 1))
    spont = epont + 1
Next y End Sub Sub openedit ()
frmbabyeditor.Visible = True
frmbabyeditor.SetFocus
'BABYEDIT.Show
'form2.Visible = True
'brain1.Visible = True End Sub Sub openf ()

fileot = "c:\test.dat"
Open fileot For Output As #2
stopf = 1
timeot = Timer

End Sub

Sub que1 ()
'If errorc = 1 Then Exit Sub sdata = 4 'command byte get que

Call datain
form1.que.Text = Str$(bits1) + Chr$(13) + Chr$(10)
Call datain
form1.que.Text = form1.que.Text + Str$(bits1) + Chr$(13) + Chr$(10)
Call datain
```

```
form1.que.Text = form1.que.Text + Str$(bits1) + Chr$(13) + Chr$(10)
Call datain
form1.que.Text = form1.que.Text + Str$(bits1) + Chr$(13) + Chr$(10)

Call datain
form1.que.Text = form1.que.Text + Str$(bits1) + Chr$(13) + Chr$(10)
Call datain
form1.que.Text = form1.que.Text + Str$(bits1) + Chr$(13) + Chr$(10)
Call datain
form1.que.Text = form1.que.Text + Str$(bits1) + Chr$(13) + Chr$(10)
Call datain
form1.que.Text = form1.que.Text + Str$(bits1) + Chr$(13) + Chr$(10)
Call datain
form1.que.Text = form1.que.Text + Str$(bits1) + Chr$(13) + Chr$(10)
Call datain
form1.que.Text = form1.que.Text + Str$(bits1)

End Sub

Sub speedd ()
If errorc = 1 Then Exit Sub paddp = padd
padd = form1.addressi.Text sdata = 11    'speed command
Call datain
speed = bits1
Call datain
form1.speedi.Text = Str$(speed + (bits1 * 256))
padd = paddp End Sub Sub startmovie ()

filem = "c:\dat1.txt"
Open filem For Input As #1
For i = 1 To 10000
Line Input #1, fin
Call linep
    For j = 1 To 6
    fmot1(i, j) = fval(j)
    Next j
If fval(3) = 8 Then Exit For
Next i
Close #1 filem = "c:\dat2.txt"
Open filem For Input As #1
For i = 1 To 10000
Line Input #1, fin
Call linep
    For j = 1 To 6
    fmot2(i, j) = fval(j)
    Next j
If fval(3) = 8 Then Exit For
Next i
Close #1 filem = "c:\dat3.txt"
```

```
Open filem For Input As #1
For i = 1 To 10000
Line Input #1, fin
Call linep
    For j = 1 To 6
    fmot3(i, j) = fval(j)
    Next j
If fval(3) = 8 Then Exit For
Next i
Close #1 filem = "c:\dat4.txt"
Open filem For Input As #1
For i = 1 To 10000
Line Input #1, fin
Call linep
    For j = 1 To 6
    fmot4(i, j) = fval(j)
    Next j
If fval(3) = 8 Then Exit For
Next i
Close #1 m1p = 1: m2p = 1: m3p = 1: m4p = 1
flagc = 0 'get first command sdata = 6 'start command
parc = &H4 'address 7
Call agOutp(commp, parc) 'send address
parc = parc Or &H1   'clear strobe line
Call agOutp(datap, sdata) 'command
Call agOutp(commp, parc) 'strobe low
time1 = Timer
Do
time2 = Timer
Loop While time2 - time1 < .01
parc = parc And &HE
Call agOutp(commp, parc) 'strobe high timeb = Timer 'begin time End Sub Sub stime1 ()
If errorc = 1 Then Exit Sub
padds = padd
padd = form1.addressi.Text
sdata = 3 'command byte
Call datain
d1 = bits1
Call datain
d2 = bits1
Call datain
d3 = bits1
Call datain
d4 = bits1
form1.timei.Text = (d4 * 16777216 + d3 * 65536 + d2 * 256 + d1) * .000008
padd = padds
End Sub
```

```
Sub stopmovie ()

sdata = 7
Call datain
timeb = 0

If stopf = 1 Then
stopf = 0
time7 = Timer
time8 = time7 - timeot
time8 = time8 - .5    'adjust time back to compensate for encoder present
timstr = Str(time8)
place = InStr(timstr, ".")
If place = 0 Then
place = Len(timstr) + 3
timstr = timstr + ".000"
Else
timstr = timstr + "000"
End If
timstr = Left(timstr, place + 3)
fin = "," + Str(form1.addressm.Text) + "," + timstr + ",8,0,0,0,"   'stop commands
Print #2, fin
Close #2
End If End Sub Sub writef ()

Dim timstr As String
Dim place As Integer
speedo = Val(form1.speedi.Text)
padd = form1.addressi.Text
Call speedd
Call encoder1
Call stime1
Call que1
speedn = Val(form1.speedi.Text)

ramp = speedn - speedo
If (ramp < 0) Then ramp = speedo - speedn
ramp = ramp \ 4
If (ramp = 0) Then ramp = 1
time7 = Timer
time8 = time7 - timeot If time8 > .5 Then
time8 = time8 - .5    'adjust time back to compensate for encoder present
timstr = Str(time8)
place = InStr(timstr, ".")
If place = 0 Then
place = Len(timstr) + 3
timstr = timstr + ".000"
Else
timstr = timstr + "000"
End If timstr = Left(timstr, place + 3)
timstr = "," + Str(form1.addressi.Text) + "," + timstr
```

```
fin = timstr + ",1," + Str(encod) + "," + form1.speedi.Text + ","
fin = fin + Str(ramp) + ","
Print #2, fin
End If End Sub
```

```c
include <math.h> extern unsigned int t1,t2,t3,t4,t5,t6,f1,f2,f3;

extern float fp;

void cmot(void)  /* control motor */

{
        float rpmc,rpmd,ramp,x,t,d;
        float posr,enct;

rpmc=(float)t1;  /* current rpm speed */
        rpmd=(float)t2;  /* desired rpm speed */
        ramp=(float)t3;
        posr=(float)t4;  /* position to go to */
        enct=(float)t5;  /* encoder position right now */

/* .1sec * 1min/60sec = .00166666 minutes */
        /* 512 counts/rev * rpm/2 * time */ t=(rpmc/ramp)*.00166666666;
        x=(rpmc*t*256.0); /*number of counts to reach zero rpm*/ if (f3>1)
        {
        x=x+ramp*1.5;
        }
        else
        {
        x=0;
        }
        f3=f3+1;
        if(f3>100) f3=100;

d=posr-enct;
        if(d<0.0) d=enct-posr;

if(x<d) /* x<d means you can still incrase rpm */
        {
                if (rpmd>=rpmc)
                {
                        if(f2<2)
                        {
                        rpmc=rpmc+ramp;
                        if(   (rpmc>rpmd) && ((rpmc-rpmd) < (1.1*ra
mp))   ) rpmc=rpmd;
```

CESC.C

```
                        }
                }
                else
                {
                        rpmc=rpmc-ramp;
                }
        }
        else
        {
                rpmc=rpmc-ramp*1.2;
        } if(rpmc<0) rpmc=0;

if( (f2==2) && (rpmc>rpmd) && ((rpmc-rpmd) < (1.1*ramp)) )
        {
                f2=3;
                rpmc=rpmd;
        } if((f2==1)&&(rpmc<fp))
        {
                f2=2;
                rpmc=fp;
        } if(f2==0)
        {
        f2=1;
        } fp=rpmc;
        t1=(unsigned)rpmc;

} void cmot4(void) /* control motor 4 */

{
        float rpmc,rpmd,ramp,x,t,d;
        float posr,enct;

rpmc=(float)t1; /* current rpm speed */
        rpmd=(float)t2; /* desired rpm speed */
        ramp=(float)t3;
        posr=(float)t4; /* position to go to */
        enct=(float)t5; /* encoder position right now */
```

CESC.C

```c
/* .1sec * 1min/60sec = .00166666 minutes */
/* 512 counts/rev * rpm/2 * time */ t=(rpmc/ramp)*.00166666666;
x=(rpmc*t*256); /*number of counts to reach zero rpm*/ if(t6==1) /*counterclockwise*/
{
d=posr-enct;
if(d<0) d=39009-(enct-posr);
}
else /*clockwise*/
{
d=enct-posr;
if(d<0) d=39009-(posr-enct);
} if(f1==1)
{
if(x<d) /* x<d means you can still increse rpm */
{
        if (rpmd>=rpmc)
        {
                if(f2<2)
                {
                rpmc=rpmc+ramp;
                if(   (rpmc>rpmd) && ((rpmc-rpmd) < (1.1*ramp))   ) rpmc=rpmd;
                }
        }
        else
        {
                rpmc=rpmc-ramp;
        }
}
else
{
        rpmc=rpmc-ramp;
}
}
else
{
        if(  (f2<2)&&(rpmd>=rpmc)  )
        {
        rpmc=rpmc+ramp;
        if(   (rpmc>rpmd) && ((rpmc-rpmd) < (1.1*ramp))   ) rpmc=rpmd;
        }
}
```

CESC.C

```
if(rpmc<0) rpmc=0;

if( (f2==2) && (rpmc>rpmd) && ((rpmc-rpmd) < (1.1*ramp)) )
{
        f2=3;
        rpmc=rpmd;
} if((f2==1)&&(rpmc<fp))
{
        f2=2;
        rpmc=fp;
} if(f2==0)
{
f2=1;
} fp=rpmc;
t1=(unsigned)rpmc;
}
*
```

CES.S   *Microprocessor Motor Control*

```
.list   +
.EXTERNAL IN,TIMER,RECD,_cmot,IPC1
.EXTERNAL _fp,_t1,_t2,_t3,_t4,_t5,_t6
.EXTERNAL _cmot4,_f1,_f2,_f3

.DEFINE PA=00H
.DEFINE PB=04H
.DEFINE PC=06H
.DEFINE PD=08H
.DEFINE PE=0AH
.DEFINE PG=02H

.DEFINE PTA=1000H
.DEFINE PTD=1008H
.DEFINE PTE=100AH
.DEFINE PTG=1002H
.DEFINE PTH=1060H
.DEFINE PTI=1800H

.DEFINE ENCL=5000H
.DEFINE ENCH=5800H      ;ENCODER INPUT PORTS
.DEFINE INFO=6000H
.DEFINE VELL=6800H
.DEFINE VELH=7000H      ;VELOCITY OUTPUT PORTS
.DEFINE COMP=7800H      ;COMPUTER INPUT PORT

.DEFINE TCNT=100EH      ;TIMER COUNTER
.DEFINE SCSR=2EH

;****************************************************
;EE STORAGE

.DEFINE MODE=2E00H      ;MODE STORAGE IN EEPROM

;****************************************************
        .PSECT _zpage

INCAPF: .BYTE   [1]     ;INDICATE INPUT CAP
STOPF:  .BYTE   [1]     ;STOP FLAG FOR HOME POSITION
CCKF:   .BYTE   [1]     ;DIRECTION FLAG FOR MOTOR
ROLLF:  .BYTE   [1]     ;FLAG INDICATE MUST GO PAST 0 POINT
RAMC:   .BYTE   [1]
RAMS:   .BYTE   [45]    ;SERIEL PORT BUFFER

FLG:    .BYTE   [1]     ;MISC FLAGS
ADDR:   .BYTE   [1]     ;ADDRESS OF UNIT
NBIN:   .BYTE   [3]
ENCS:   .BYTE   [2]     ;STORE ENCODER COUNTS
RAMP:   .BYTE   [2]     ;STORE ENCODER COUNTS
```

```
                        CES.S

SPEEDH:   .BYTE    [1]      ;MAX SPEED OF MOTOR
SPEEDL:   .BYTE    [1]
SPEDCH:   .BYTE    [1]      ;WHATS IN MOTOR NOW
SPEDCL:   .BYTE    [1]
POSH:     .BYTE    [1]
POSL:     .BYTE    [1]      ;POSITION FOR MOTOR
REFE:     .BYTE    [1]      ;INCR COUNTER IN REFERENCE ROUTINE
IPCTIM:   .BYTE    [2]      ;TIME OF INTERRUPT
IPCFLG:   .BYTE    [1]      ;FLAG FOR INTERRUPT

ROLLN:    .BYTE    [1]      ;NUMBER OF ROLLS SET IN ROLL COMMAND

_fp:      .BYTE    [4]
_t1:      .BYTE    [2]
_t2:      .BYTE    [2]
_t3:      .BYTE    [2]
_t4:      .BYTE    [2]
_t5:      .BYTE    [2]
_t6:      .BYTE    [2]
_f1:      .BYTE    [2]
_f2:      .BYTE    [2]
_f3:      .BYTE    [2]

G1:       .BYTE    [1]      ;ASCII STORAGE
G2:       .BYTE    [1]
G3:       .BYTE    [1]
G4:       .BYTE    [1]
G5:       .BYTE    [1]
G6:       .BYTE    [1]

COMQP:    .BYTE    [10]     ;INFO SEND BACK TO COMPUTER WHAT WAS EXECUTED
COMQ:     .BYTE    [100]    ;COMMAND Q ROOM FOR UP TO 40 COMMANDS
RCOMD:    .BYTE    [20]     ;STORAGE OF BYTES RECEIVED FROM COMPUTER

.PSECT _data

T1:       .BYTE    [2]
T2:       .BYTE    [2]
T3:       .BYTE    [2]
T4:       .BYTE    [2]

TIMEL:    .BYTE    [2]      ;START TIME TOTALS
TIMEH:    .BYTE    [2]
TIMEB:    .BYTE    [2]      ;BEGIN START TIME
TIMEI:    .BYTE    [2]      ;TIME INC ON INTERRUPT
TIMII:    .BYTE    [2]      ;TIME INC ON INTERRUPT
MOTTIM:   .BYTE    [2]      ;MOTOR ROUTINE TIME
INTTIM:   .BYTE    [2]      ;INTERRUPT CAPTURE TIME

M2:       .BYTE    [2]      ;USED IN MULT ROUTINE 16X16 AND 24X16
```

CES.S

```
M1:     .BYTE   [2]
R2:     .BYTE   [2]
R1:     .BYTE   [2]

N2:     .BYTE   [2]     ;USED IN DIV ROUTINE
N1:     .BYTE   [2]
D2:     .BYTE   [2]
D1:     .BYTE   [2]
DIVR:   .BYTE   [4]

;****************************************************************

.psect  _text

;*******************************************************

IN:     LDS     #3FFH           ;STACK POINTER
        LDAA    #83H            ;ENABLE TIMER INTERRUPT AND
        STAA    1024H           ;PRESCALE OF 16 8USEC
        CLRA
        STAA    1035H           ;DISABLE BLOCK PROTECT
        LDAA    103FH           ;EEPROM AT 2000H
        CMPA    #2FH
        BEQ     INA             ;JMP IF CONTENTS OK

LDAA    #2FH
        STAA    M1
        LDY     #M1
        LDX     #103FH
        JSR     WRIT1
        JSR     WATCH

INA:    LDAA    #10H
        STAA    1035H           ;ENABLE PROTECT CONFIG
        LDX     #1000H          ;BASE ADDRESS
        LDAA    #05H
        STAA    5DH,X           ;ENABLE 32K EPROM
        LDAA    #00H
        STAA    5EH,X           ;GCS NO VALID START ADDRESS

LDAA    #079H
        STAA    01H,X           ;PORT A OUTPUTS
        LDAA    #0F6H
        STAA    09H,X           ;PORT D OUTPUTS PD3,PD0 INPUTS
        BCLR    04H,PD,X        ;SET DTR ON SERIEL LINE
        BSET    20H,PD,X        ;SET PD5 HIGH FOR ENCODER LOAD

LDAA    #30H
        STAA    2BH,X           ;9600 BAUD

LDAA    #2CH
```

CES.S

```
        STAA    2DH,X           ;ENABLE REC,TRAN AND REC INTERRUPT
        LDAB    #0
        STAB    INCAPF
        STAB    IPCFLG

LDAA    #30H
        STAA    1021H           ;CAPTURE ON ANY EDGE
        LDAA    #04H
        STAA    1022H           ;ENABLE INPUT CAPTURE 1
        LDAA    #04H
        STAA    1023H           ;CLEAR FLG

JSR     STAT            ;DO START UP

;***************************************************************

MAIN:   JSR     WATCH
        JSR     GADD            ;GET ADDRESS
        LDX     #1000H
        CLI

JSR     IPCS    ;SEE IF INPUT CAP OCCURRED
        JSR     IPACT   ;SEE IF ACTIVATE INPUT CAPTURE
        JSR     DOC     ;DO COMMAND
        JSR     AMOT    ;CHECK MANUAL MOTOR CONTROL
        JSR     RCOM    ;RECEIVE COMMAND

LDD     TCNT
        SUBD    MOTTIM
        CPD     #12500  ;COMPARE 100,000 USEC
        BCS     MAIN1

LDD     MOTTIM
        ADDD    #12500
        STD     MOTTIM  ;UPDATE MOTOR TIME
        LDX     #1000H
        BSET    40H,PA,X
        BCLR    40H,PA,X        ;SHOW ITS ALIVE
        JSR     MOTC

MAIN1:
;       JSR     ESTOP
        JMP     MAIN

;***************************************************************
;LOOK FOR START UP

STAT:   LDY     #0
        LDAB    #0
STAT1:  STAB    0,Y             ;ZERO MEMORY
```

CES.S

```
        INY
        CPY     #500
        BCS     STAT1

JSR     GADD            ;GET ADDRESS

STAT2:  LDD     #0
        STD     TIMEI
        LDD     TCNT
        STD     TIMEB           ;INIT BEGIN TIME

LDD     TIMEI
        BNE     STAT2

JSR     QSHI    ;GET RID OF COMMAND
        JSR     QSHI    ;GET RID OF COMMAND
        JSR     QSHI    ;GET RID OF COMMAND
        JSR     QSHI    ;GET RID OF COMMAND
        JSR     QSHI    ;GET RID OF COMMAND
        JSR     QSHI    ;GET RID OF COMMAND
        JSR     QSHI    ;GET RID OF COMMAND
        JSR     QSHI    ;GET RID OF COMMAND
        JSR     QSHI    ;GET RID OF COMMAND
        JSR     QSHI    ;GET RID OF COMMAND
        CLR     STOPF
        RTS

;***********************************************************
;DO COMMAND

DOC:    LDY     #COMQ
        LDAB    0,Y
        BNE     DOC1    ;JMP IF THERE IS A COMMAND
        RTS

DOC1:   CMPB    #2
        BNE     DOC2    ;JMP IF NOT LASER PLAYER COMMAND

JSR     SEET    ;SEE IF ITS TIME FOR COMMAND
        BCS     DOC1A
        RTS
DOC1A:  JSR     LASER
        JSR     QSHI    ;GET RID OF COMMAND
        RTS

DOC2:   CMPB    #1
        BNE     DOC3    ;JMP IF NOT MOTOR COMMAND

JSR     SEET    ;SEE IF ITS TIME FOR COMMAND
        BCS     DOC2A
```

CES.S

```
        RTS
DOC2A:  JSR     MOTI
        JSR     QSHI        ;GET RID OF COMMAND
        RTS

DOC3:   NOP                 ;OTHER COMMANDS

DOCE:   JSR     QSHI        ;GET RID OF COMMAND
        RTS

;************************************************
;DO OTHER COMMANDS

OCOM:   LDAB    COMP        ;GET COMPUTER DATA 1ST BYTE
        CMPB    #03H
        BNE     OCOM1
        JSR     STTC        ;SEND TIME TO COMPUTER
        RTS
OCOM1:  CMPB    #04H
        BNE     OCOM2
        JSR     SCQC        ;SEND COMMAND QUE TO COMPUTER
        RTS
OCOM2:  CMPB    #05H
        BNE     OCOM2A
        JSR     SENC        ;SEND ENCODER COUNTS
        RTS
OCOM2A: CMPB    #9
        BNE     OCOM2B
        JSR     GETO        ;GET OUTPUT PORT BYTES FROM COMPUTER
        LDX     #1000H
        LDAA    #0H
        STAA    03H,X       ;MAKE PORT G INPUTS
        JSR     SBGB        ;SEND BYTES GET BYTES
        RTS
OCOM2B: CMPB    #10
        BNE     OCOM2C
        JSR     SITC        ;SEND INPUT BYTES TO COMPUTER
        RTS
OCOM2C: CMPB    #11
        BNE     OCOM4
        JSR     SSPED       ;SEND SPEED TO COMPUTER
        RTS

OCOM4:  CMPB    #07H        ;STOP MOVIE
        BNE     OCOM5
        LDAB    #7
        STAB    R1
        JSR     SDTC
        JSR     HOME
```

CES.S

```
           RTS

OCOM5:     CMPB    #12
           BNE     OCOM5A
           LDAB    #12
           STAB    R1
           JSR     SDTC        ;ECHO BACK
           JSR     ESTOP       ;ENGAGE ESTOP
           RTS

OCOM5A:    CMPB    #13
           BNE     OCOM5B
           LDAB    #13
           STAB    R1
           JSR     SDTC        ;ECHO BACK
           JSR     ESTAR       ;REMOVE ESTOP
           RTS

OCOM5B:    CMPB    #14
           BNE     OCOM5C
           LDAB    #14
           STAB    R1
           JSR     SDTC        ;ECHO BACK
           JSR     HOME        ;HOME POSITION
           RTS

OCOM5C:    CMPB    #15
           BNE     OCOMX
           JSR     ROLLP       ;GET NUMBER OF ROLLS
           RTS

OCOMX:     STAB    R1          ;ECHO BYTE
           JSR     SDTC        ;SEND DATA TO COMPUTER
OCOME:     RTS

;***********************************************************
;SEND OUTPUT PORT BYTES GET INPUT PORT BYTES FROM SMART TERMINAL

SBGB:      CLR     RAMC

LDAB    #55H
           JSR     TRAN        ;COMMAND SEND 4 BYTES
           JSR     DLY1

LDY     #RCOMD+1

LDAB    0,Y
           JSR     TRAN        ;SEND OUTPUT PORT BYTE1
           JSR     DLY1
           LDAB    0,Y
           JSR     TRAN        ;SEND OUTPUT PORT BYTE1
```

CES.S

```
        JSR     DLY1
        INY

LDAB    0,Y
        JSR     TRAN    ;SEND OUTPUT PORT BYTE2
        JSR     DLY1
        LDAB    0,Y
        JSR     TRAN    ;SEND OUTPUT PORT BYTE2
        JSR     DLY1
        INY

LDAB    0,Y
        JSR     TRAN    ;SEND OUTPUT PORT BYTE3
        JSR     DLY1
        LDAB    0,Y
        JSR     TRAN    ;SEND OUTPUT PORT BYTE3
        JSR     DLY1
        INY

LDAB    0,Y
        JSR     TRAN    ;SEND OUTPUT PORT BYTE4
        JSR     DLY1
        LDAB    0,Y
        JSR     TRAN    ;SEND OUTPUT PORT BYTE4
        JSR     DLY1

RTS             ;RECEIVE BYTES WILL COME IN AUTOMATIC

;RAMS SHOULD EQUAL AAH AND RAMS+1 TO
;RAMS+10 CONTAIN INPUTS
;RAMS+1 TO RAMS+10 SHOULD EQUAL RAMS+11 TO RAMS+20

;************************************************************
;GET OUTPUT PORT BYTES FROM COMPUTER

GETO:   LDAB    0,Y
        STAB    R1
        JSR     SDTC    ;SEND DATA TO COMPUTER
        BCS     GETO1   ;JMP IF OK
        JMP     GETOE

GETO1:  CPY     #RCOMD+4
        BCC     GETOE   ;JMP IF FINISHED

INY
        JSR     STRL    ;WAIT FOR STROBE GO LOW
        BCS     GETO2   ;JMP IF OK
        JMP     GETOE
GETO2:  LDAB    COMP    ;GET COMPUTER DATA
        STAB    0,Y
```

CES.S

```
            JMP     GETO

GETOE:      RTS

;************************************************************
;GET NUMBER OF ROLLS FOR MOTOR 4

ROLLP:      LDAB    0,Y
            STAB    R1
            JSR     SDTC            ;SEND DATA TO COMPUTER
            BCS     ROLLP1          ;JMP IF OK
            JMP     ROLLPE

ROLLP1:     CPY     #RCOMD+1
            BCC     ROLLPE          ;JMP IF FINISHED

INY
            JSR     STRL            ;WAIT FOR STROBE GO LOW
            BCS     ROLLP2          ;JMP IF OK
            JMP     ROLLPE
ROLLP2:     LDAB    COMP            ;GET COMPUTER DATA
            STAB    ROLLN
            JMP     ROLLP
ROLLPE:     RTS

;************************************************************
;RECEIVE BYTE FROM COMPUTER
;ADDRES ON PE5,PE6,PE7 FROM CONTROL PORT
;INVERT PE5 AND PE7

RCOM:       LDX     #1000H
            BRCLR   RCOM1,10H,PE,X  ;JMP IF STROBE LOW
            RTS

RCOM1:      LDY     #RCOMD
            LDAB    COMP            ;GET COMPUTER DATA 1ST BYTE
            LDAB    COMP            ;GET COMPUTER DATA 1ST BYTE
            LDAB    COMP            ;GET COMPUTER DATA 1ST BYTE
            STAB    0,Y

CMPB    #6              ;SEE IF START COMMAND
            BNE     RCOM1X          ;JMP IF NOT START
            JSR     RADDR
            CMPA    #7
            BEQ     RCOM1Z
            JMP     RCOME
RCOM1Z:     JSR     STAT            ;DO STARTUP
            JSR     DLY50
            RTS
```

CES.S

```
RCOM1X:
        JSR     RADDR
        CMPA    ADDR            ;ADDRESS OFF THE JUMPERS
        BEQ     RCOM1C          ;JMP IF ADDRESS THE SAME
        JMP     RCOME

RCOM1C:
        LDAA    #0FFH           ;PORT G NORMALLY HIGH
        STAA    PTG             ;PG4 IS INVERTED SO COMPUTER SEES
LOW
        STAA    03H,X           ;MAKE PORT G OUTPUTS

RCOM1A: LDAB    0,Y
        CMPB    #03H
        BCS     RCOM4           ;JMP IF DO MOTOR OR LASER
RCOM1B: JSR     OCOM            ;DO OTHER COMMANDS
        JMP     RCOME

RCOM4:  LDAB    0,Y
        STAB    R1
        JSR     SDTC            ;SEND DATA TO COMPUTER
        BCS     RCOM4A          ;JMP IF OK
        JMP     RCOME

RCOM4A: CPY     #RCOMD+9
        BCC     RCOM6           ;JMP IF FINISHED

INY
        JSR     STRL            ;WAIT FOR STROBE GO LOW
        BCS     RCOM5           ;JMP IF OK
        JMP     RCOME
RCOM5:  LDAB    COMP            ;GET COMPUTER DATA
        STAB    0,Y
        JMP     RCOM4

RCOM6:  JSR     QCOM            ;PUT DATA INTO COMMAND Q

RCOME:  LDX     #1000H
        LDAA    #0H
        STAA    03H,X           ;MAKE PORT G INPUTS
        RTS

RADDR:  LDX     #1000H
        LDAA    PE,X
        LSRA
        LSRA
        LSRA
        LSRA
        LSRA
        RTS
```

CES.S

```
;************************************************************
;SEND TIME TO COMPUTER

STTC:   JSR     TTIME
        LDAB    TIMEL+1         ;SEND TIME TO COMPUTER
        STAB    R1
        JSR     SDTC
        LDAB    TIMEL
        STAB    R1
        JSR     PSDTC
        LDAB    TIMEH+1
        STAB    R1
        JSR     PSDTC
        LDAB    TIMEH
        STAB    R1
        JSR     PSDTC
        RTS

;************************************************************
;SEND INPUT BYTES FROM INPUT PORTS TO COMPUTER
;RAMS SHOULD EQUAL AAH AND RAMS+1 TO
;RAMS+10 CONTAIN INPUTS
;RAMS+1 TO RAMS+10 SHOULD EQUAL RAMS+11 TO RAMS+20

SITC:   LDAB    RAMC
        CMPB    #21
        BCC     SITC1   ;JMP IF BYTES COME IN
SITC3:  LDD     #0
        STD     RAMS+1
        STD     RAMS+3
        STD     RAMS+5
        STD     RAMS+7
        STD     RAMS+9  ;INDICATE NO VALID BYTES
        BRA     SITC2

SITC1:  LDD     RAMS+1
        CPD     RAMS+11
        BNE     SITC3
        LDD     RAMS+3
        CPD     RAMS+13
        BNE     SITC3
        LDD     RAMS+5
        CPD     RAMS+15
        BNE     SITC3
        LDD     RAMS+7
        CPD     RAMS+17
        BNE     SITC3
        LDD     RAMS+9
        CPD     RAMS+19
        BNE     SITC3
```

CES.S

```
SITC2:  LDAB    RAMS+1
        STAB    R1
        JSR     SDTC

LDAB    RAMS+2
        STAB    R1
        JSR     PSDTC

LDAB    RAMS+3
        STAB    R1
        JSR     PSDTC

LDAB    RAMS+4
        STAB    R1
        JSR     PSDTC

LDAB    RAMS+5
        STAB    R1
        JSR     PSDTC

LDAB    RAMS+6
        STAB    R1
        JSR     PSDTC

LDAB    RAMS+7
        STAB    R1
        JSR     PSDTC

LDAB    RAMS+8
        STAB    R1
        JSR     PSDTC

LDAB    RAMS+9
        STAB    R1
        JSR     PSDTC

LDAB    RAMS+10
        STAB    R1
        JSR     PSDTC
        CLR     RAMC
        RTS

;************************************************************
;SEND COMMAND QUE TO COMPUTER

SCQC:
        LDAB    COMQP
        STAB    R1
        JSR     SDTC
        LDAB    COMQP+1
        STAB    R1
```

CES.S

```
        JSR     PSDTC
        LDAB    COMQP+2
        STAB    R1
        JSR     PSDTC
        LDAB    COMQP+3
        STAB    R1
        JSR     PSDTC
        LDAB    COMQP+4
        STAB    R1
        JSR     PSDTC
        LDAB    COMQP+5
        STAB    R1
        JSR     PSDTC
        LDAB    COMQP+6
        STAB    R1
        JSR     PSDTC
        LDAB    COMQP+7
        STAB    R1
        JSR     PSDTC
        LDAB    COMQP+8
        STAB    R1
        JSR     PSDTC
        LDAB    COMQP+9
        STAB    R1
        JSR     PSDTC
        RTS

;************************************************************
;SEND ENCODER COUNTS

SENC:   JSR     GEC             ;GET ENCODER COUNTS
        LDAB    ADDR
        CMPB    #3
        BNE     SENC1           ;JMP IF NOT MOTOR 4 ROLL
        LDAB    CCKF
        BEQ     SENC2           ;JMP IF CLOCKWISE MOVEMENT

LDAB    ENCS+1
        ORAB    #01H            ;MAKE ODD
        STAB    ENCS+1
        BRA     SENC1

SENC2:  LDAB    ENCS+1
        ANDB    #0FEH           ;MAKE EVEN
        STAB    ENCS+1

SENC1:  LDAB    ENCS+1
        STAB    R1
        JSR     SDTC
        LDAB.   ENCS
        STAB    R1
```

CES.S

```
          JSR     PSDTC
          RTS

;************************************************************
;SEND SPEED TO COMPUTER

SSPED:
          LDAB    SPEDCL
          STAB    R1
          JSR     SDTC
          LDAB    SPEDCH
          ANDB    #3FH
          STAB    R1
          JSR     PSDTC
          RTS

;************************************************************
;SEND DATA TO COMPUTER DATA IN M1
;ASSUME STROBE LOW AND PORT G ARE OUTPUTS INIT TO HIGHS
;LEAVE ROUTINE WITH STROBE HIGH AND BUSY LOW ON COMPUTER SIDE

SDTC:     LDX     #1000H
          LDAB    R1
          ORAB    #10H            ;KEEP BUSY LOW
          STAB    PG,X            ;ECHO BACK DATA LOWER 4 BITS
          STAB    PG,X            ;ECHO BACK DATA LOWER 4 BITS
          STAB    PG,X            ;ECHO BACK DATA LOWER 4 BITS
          BCLR    10H,PG,X        ;INDICATE DATA PRESENT HIGH TO COMPUTER
                                  ;ACKNOWLEDGE GOT BYTE FROM COMPUTER
          JSR     WATCH
          JSR     STRH            ;WAIT FOR STROBE GO HIGH
                                  ;HC11 KNOWS COMPUTER GOT DATA
          BCS     SDTC1           ;JMP IF OK
;         JMP     SDTC4

SDTC1:    BSET    10H,PG,X        ;TAKE LINE BACK LOW SO
                                  ;COMPUTER WAITS FOR NEXT 4 BITS
          JSR     STRL            ;WAIT FOR STROBE GO LOW
                                  ;SO KNOW COMPUTER WAITING FOR DATA
          BCS     SDTC2           ;JMP IF OK
;         JMP     SDTC4

SDTC2:    LDAB    R1
          LSRB
          LSRB
          LSRB
          LSRB
          ORAB    #10H            ;KEEP BUSY LOW
          STAB    PG,X            ;ECHO BACK DATA UPPER 4 BITS
```

CES.S

```
                STAB    PG,X            ;ECHO BACK DATA UPPER 4 BITS
                STAB    PG,X            ;ECHO BACK DATA UPPER 4 BITS
                BCLR    10H,PG,X        ;INDICATE DATA PRESENT HIGH TO COM
PUTER
                JSR     STRH            ;WAIT FOR STROBE GO HIGH
                BCS     SDTC3           ;JMP IF OK
        ;       JMP     SDTC4
SDTC3:          BSET    10H,PG,X        ;INDICATE READY FOR NEXT BYTE
                SEC                     ;RETURN WITH SET CARRY IF OK
                RTS
SDTC4:          CLC                     ;RETURN WITH CLEAR CARRY IF PROBLE
M
                RTS

PSDTC:          JSR     STRL            ;WAIT FOR STROBE GO LOW
                BCS     PSDTC2          ;JMP IF OK
        ;       JMP     SDTC4
PSDTC2:         JMP     SDTC

;**********************************************************
;WAIT FOR STROBE TO GO HIGH

STRH:           LDX     #1000H
                LDD     TCNT            ;GET INIT TIME
                STD     M1
STRH1:          BRSET   STRH2,10H,PE,X  ;JMP IF STROBE HIGH
                LDD     TCNT
                SUBD    M1
                CPD     #4000
                BCS     STRH1           ;JMP IF 24 MSEC NOT UP
                RTS                     ;RETURN WITH CLEAR CARRY
STRH2:          SEC
                RTS                     ;RETURN WITH SET CARRY

;**********************************************************
;WAIT FOR STROBE TO GO LOW

STRL:           LDX     #1000H
                LDD     TCNT            ;GET INIT TIME
                STD     M1
STRL1:          BRCLR   STRL2,10H,PE,X  ;JMP IF STROBE HIGH
                LDD     TCNT
                SUBD    M1
                CPD     #4000
                BCS     STRL1           ;JMP IF 24 MSEC NOT UP
                RTS                     ;RETURN WITH CLEAR CARRY
STRL2:          SEC
                RTS                     ;RETURN WITH SET CARRY

;**********************************************************
;PUT COMMAND IN Q
```

CES.S

```
QCOM:    LDX     #RCOMD
         LDY     #COMQ
QCOM2:   LDAB    0,Y
         BEQ     QCOM1   ;JMP IF EMPTY
         XGDY
         ADDD    #10
         XGDY
         CPY     #COMQ+100
         BCS     QCOM2   ;JMP IF NOT AT END OF Q
         RTS

QCOM1:   LDAB    0,X
         STAB    0,Y     ;STORE BYTE
         INX
         INY
         CPX     #RCOMD+10
         BCS     QCOM1
         RTS

;************************************************************
;SHIFT Q

QSHI:    LDY     #COMQP
         LDX     #COMQ
QSHI1:   LDD     0,X
         STD     0,Y
         INY
         INY
         INX
         INX
         CPX     #COMQ+100
         BCS     QSHI1
         LDD     #0
         STD     COMQ+90
         STD     COMQ+92
         STD     COMQ+94
         STD     COMQ+96
         STD     COMQ+98
         RTS

;************************************************************
;GET ADDRESS OF MODULE A0,A1,A2=PE2,PE3,PG5

GADD:    LDX     #1000H
         CLR     ADDR
         BRCLR   GADD1,20H,PG,X
         BSET    04H,ADDR
GADD1:   LDAA    PE,X
         LSRA
         LSRA
```

CES.S

```
        ANDA    #03H
        ORAA    ADDR
        STAA    ADDR
        RTS

;************************************************************
;ESTOP IF LIMIT SWITCH IS HIT

ESTOP:  LDX     #1000H

JMP     ESTOP2

BRCLR   ESTOP1,02H,PA,X ;JMP IF LIM SWITCH ENGAGED
        RTS
ESTOP1: JSR     DLY10
        BRCLR   ESTOP2,02H,PA,X ;JMP IF LIM SWITCH ENGAGED
        RTS
ESTOP2: BRCLR   ESTAR,80H,PA,X  ;JMP IF OVERIDE ESTOP CONTROL
        BSET    08H,PA,X        ;ENGAGE ESTOP
        RTS

;*****************************
;REMOVE ESTOP

ESTAR:  LDX     #1000H
        BCLR    08H,PA,X
        RTS

;************************************************************
;DO LASER COMMAND

LASER:  LDAB    COMQ+7
        STAB    NBIN
        LDAB    COMQ+6
        STAB    NBIN+1
        LDAB    COMQ+5
        STAB    NBIN+2
        JSR     BINASC    ;24 BIT BINARY TO ASCII
                          ;NUMBER CANNOT BE LARGER THAN 999,999.0

LDAB    #55H
        JSR     TRAN      ;FRAME NUMBER MODE
        JSR     DLY5

LDAB    #43H
        JSR     TRAN      ;SEND LASER FRAME NUMBER
        JSR     DLY5

LDAB    G6
        ADDB    #48
        JSR     TRAN      ;SEND NUMBER
```

CES.S

```
        JSR     DLY5

LDAB    G5
        ADDB    #48
        JSR     TRAN    ;SEND NUMBER
        JSR     DLY5

LDAB    G4
        ADDB    #48
        JSR     TRAN    ;SEND NUMBER
        JSR     DLY5

LDAB    G3
        ADDB    #48
        JSR     TRAN    ;SEND NUMBER
        JSR     DLY5

LDAB    G2
        ADDB    #48
        JSR     TRAN    ;SEND NUMBER
        JSR     DLY5

LDAB    G1
        ADDB    #48
        JSR     TRAN    ;SEND NUMBER
        JSR     DLY5

LDAB    #40H
        JSR     TRAN    ;END OF PARAMETERS

JSR     RECB
        LDAB    #71H
        JSR     TRAN    ;START RECORDER
        RTS

;************************************************************
;RECEIVE BYTE ON SERIEL LINE

RECB:   CLR     RAMC
        LDD     TCNT                    ;GET INIT TIME
        STD     M1
RECB2:  LDAB    RAMC
        BNE     RECB1   ;JMP IF BYTE COME IN

JSR     WATCH
        LDD     TCNT
        SUBD    M1
        CPD     #50000          ;WAIT AT LEAST 400 MSEC
        BCS     RECB2
        RTS                     ;RETURN WITH CLEAR CARRY
```

CES.S

```
RECB1:  LDAB    RAMS
        CLR     RAMC
        CMPB    #01H        ;SEE IF COMPLETION CODE
        BNE     RECB2

JSR     DLY5
        SEC
        RTS                 ;RETURN WITH SET CARRY

;***********************************
;FIND HOME POSITION

HOME:   LDAB    #0
        STAB    SPEDCL
        STAB    SPEEDL
        LDAB    #0
        STAB    SPEDCH
        STAB    SPEEDH
        JSR     MPUL        ;STOP MOTOR

LDD     TCNT
        STD     MOTTIM
HOME1:  JSR     RCOM
        JSR     WATCH
        LDD     TCNT
        SUBD    MOTTIM
        CPD     #50000      ;COMPARE .4 SEC
        BCS     HOME1

LDD     TCNT
        STD     MOTTIM

LDAB    #100
        STAB    SPEDCL
        STAB    SPEEDL
        LDAB    #0
        STAB    SPEDCH
        STAB    SPEEDH
        LDD     #16
        STD     RAMP
        CLR     REFE        ;REFERENCE COUNTER
        BSET    40H,SPEDCH  ;COUNTERCLOCKWISE ROTATION
        JSR     MPUL
        LDAB    #255
        STAB    STOPF       ;SET STOP FLAG ON REFERENCE
        RTS

;***********************************
;MOTOR CONTROL INIT

MOTI:   LDAB    COMQ+5
```

CES.S

```
        STAB    POSL        ;POSITION OF MOTOR LOW BYTE
        LDAB    COMQ+6
        STAB    POSH        ;POSITION OF MOTOR HIGH BYTE
        LDAB    COMQ+7
        STAB    SPEEDL
        LDAB    COMQ+8
        ANDB    #3FH        ;MAX SPEED 14 BIT
        STAB    SPEEDH
        LDAB    COMQ+9
        LDAA    #4
        MUL
        STD     RAMP
        CLR     REFE        ;REFERENCE COUNTER
        LDD     #0
        STD     _f1
        STD     _f2
        STD     _f3

LDAB    ADDR
        CMPB    #3
        BEQ     MOT4I       ;JMP IF MOTOR 4 ROLL

MOTI1:  JSR     GEC         ;GET ENCODER COUNTS
        LDD     ENCS
        CPD     #50000      ;LARGE COUNTS INDICATE NEAR ZERO
        BCS     MOTI4
        LDD     #0
        STD     ENCS
MOTI4:  CPD     POSH
        BCC     MOTI2       ;JMP IF COUNTERCLOCKWISE ROTATION

MOTI3:  CLR     CCKF        ;INDICATE CLOCKWISE ROTATION
        RTS

MOTI2:  LDAB    #255
        STAB    CCKF        ;INDICATE COUNTER CLOCKWISE ROTATION
        RTS

;********

MOT4I:  JSR     GECM4       ;GET ENCODER COUNTS FOR MOTOR 4
        LDD     ENCS
        CPD     POSH
        BCC     MOT4IA      ;JMP IF MOTOR > DESIRED POSITION
        CLR     ROLLF
        BRA     MOT4IB

MOT4IA: LDAB    #255
        STAB    ROLLF       ;SET FLAG MUST SEE REFE INC
```

CES.S

```
MOT4IB: LDX     #1000H
        BRSET   MOT4IC,01H,POSL         ;JMP IF ODD
        CLR     CCKF                    ;INDICATE CLOCKWISE ROTATION
        RTS
MOT4IC: LDAB    #255
        STAB    CCKF                    ;INDICATE COUNTER CLOCKWISE ROTATION
        RTS

;************************************
;MOTOR CONTROL

MOTC:   LDAB    STOPF
        BEQ     MOTCC     ;JMP IF NOT DOING HOME POSITION
        RTS

MOTCC:  LDX     #1000H
        BRSET   MOTCCC,40H,PG,X ;JMP IF NOT IN MOTOR MANUAL CONTROL
        RTS

MOTCCC: LDAB    ADDR
        CMPB    #3
        BNE     MOTCS1    ;JMP IF NOT MOTOR 4
        JSR     MOT4      ;DO MOTOR 4
        RTS

MOTCS1: JSR     GEC                     ;GET ENCODER COUNTS
        LDD     ENCS
        CPD     #50000                  ;LARGE COUNTS INDICATE NEAR ZERO
        BCS     MOTC1
        LDD     #0
        STD     ENCS
MOTC1:
        CPD     POSH
        BCC     MOTC2
        LDAB    CCKF
        BEQ     MOTC4                   ;JMP IF STILL NOT TO TARGET
        BRA     MOTC3
MOTC2:  LDAB    CCKF
        BNE     MOTC4                   ;JMP IF STILL NOT TO TARGET

MOTC3:  LDD     #0
        STD     SPEEDH                  ;AT ZERO CROSSING SET TO 0

MOTC4:
        LDD     SPEDCH                  ;CURRENT SPEED
        ANDA    #3FH
        STD     _t1
        LDD     SPEEDH                  ;DESIRED SPEED
```

CES.S

```
            STD     _t2
            LDD     RAMP
            STD     _t3
            LDD     POSH            ;DESIRED POSITION
            STD     _t4
            LDD     ENCS            ;CURRENT POSITION
            STD     _t5

JSR     _cmot           ;SET MOTOR SPEED

LDD     _t1
            ANDA    #3FH
            STD     SPEDCH

LDAB    CCKF
            BNE     MOTC5
            BCLR    40H,SPEDCH      ;CLOCKWISE ROTATION
            JSR     MPUL
            RTS

MOTC5:      BSET    40H,SPEDCH      ;COUNTERCLOCKWISE ROTATION
            JSR     MPUL
            RTS

;****************************************

MPUL:       LDAB    SPEDCL
            STAB    VELL
            LDAB    SPEDCH
            STAB    VELH

BSET    80H,SPEDCH      ;PULSE DATA VALID HIGH
            LDAB    SPEDCH
            STAB    VELH
            JSR     DLY1
            JSR     DLY1
            JSR     DLY1
            JSR     DLY1            ;WAIT FOR 4 MSEC
            BCLR    80H,SPEDCH
            LDAB    SPEDCH
            STAB    VELH
            RTS

;****************************************
;GET ENCODER COUNTS FOR MOTOR 4

GECM4:      JSR     GEC             ;GET ENCODER COUNTS
            LDD     ENCS
            CPD     #50000          ;LARGE COUNTS INDICATE REVERSE DIR
            BCS     GECM4A
            LDD     ENCS
```

CES.S

```
            ADDD    #39009          ;ADD MAX COUNT POSSIBLE
            CPD     #39010
            BCS     GECM4A          ;JMP IF UNDER MAX VALUE
            LDD     #0
GECM4A:     STD     ENCS            ;ADJUST COUNT BECAUSE OF REVERSE
            RTS

;***********************************
;MOTOR CONTROL FOR MOTOR 4 ROLL

MOT4:       JSR     GECM4           ;GET ENCODER COUNTS FOR MOTOR 4

JSR     ZERO            ;SEE IF CROSS ZERO SET SPEED TO ZERO

MOT44:      LDD     SPEDCH          ;CURRENT SPEED
            ANDA    #3FH
            STD     _t1
            LDD     SPEEDH          ;DESIRED SPEED
            STD     _t2
            LDD     RAMP
            LSLD                    ;MAKE RAMP GREATER FOR MOTOR 4
            STD     _t3
            LDD     POSH            ;DESIRED POSITION
            STD     _t4
            LDD     ENCS            ;CURRENT POSITION
            STD     _t5

LDAB    CCKF
            BNE     MOT41           ;JMP IF GOING COUNTERCLOCKWISE
            LDD     #0
            STD     _t6
            BRA     MOT42
MOT41:      LDD     #1
            STD     _t6

MOT42:
            JSR     _cmot4          ;SET MOTOR SPEED

LDD     _t1
            ANDA    #3FH
            STD     SPEDCH

LDAB    CCKF
            BNE     MOT45
            BCLR    40H,SPEDCH      ;CLOCKWISE ROTATION
            JSR     MPUL
            RTS

MOT45:      BSET    40H,SPEDCH      ;COUNTERCLOCKWISE ROTATION
            JSR     MPUL
```

CES.S

```
        RTS

;**************************************
;SEE IF CROSS ZERO POINT FOR MOTOR 4

ZERO:   LDAB    REFE
        SUBB    ROLLN
        BCC     ZEROS       ;JMP IF DONE ROLLS NOW CHECK FOR ZERO
        RTS

ZEROS:  LDD     #1
        STD     _f1
        LDAB    ROLLN
        ADDB    #1
        STAB    G1
        ADDB    #1
        STAB    G2
        LDAB    ROLLF
        BNE     ZERO1       ;JMP IF START > END AT BEGIN TIME

;*********************
        LDAB    CCKF
        BNE     ZERO5       ;JMP IF GOING COUNTERCLOCKWISE

LDD     ENCS
        CPD     POSH
        BCS     ZERO7       ;JMP IF START < END
        LDAB    REFE
        CMPB    G2
        BCC     ZEROO       ;JMP IF PASSED TARGET
        RTS

ZERO7:  LDAB    REFE
        CMPB    G1
        BCC     ZEROO       ;JMP IF PASSED TARGET
        RTS

ZERO5:  LDD     ENCS
        CPD     POSH
        BCS     ZERO6       ;JMP IF START < END
        LDAB    REFE
        CMPB    ROLLN
        BCC     ZEROO       ;JMP IF PASSED TARGET
        RTS

ZERO6:  LDAB    REFE
        CMPB    G1
        BCC     ZEROO       ;JMP IF PASSED TARGET
        RTS
```

CES.S

;********************

```
ZERO1:  LDAB    CCKF
        BNE     ZERO2       ;JMP IF GOING COUNTERCLOCKWISE

LDD     ENCS
        CPD     POSH
        BCS     ZERO4       ;JMP IF START < END
        LDAB    REFE
        CMPB    G1
        BCC     ZEROO       ;JMP IF PASSED TARGET
        RTS

ZERO4:  LDAB    REFE
        CMPB    ROLLN
        BCC     ZEROO       ;JMP IF PASSED TARGET
        RTS

ZERO2:  LDD     ENCS
        CPD     POSH
        BCS     ZERO3       ;JMP IF START < END
        LDAB    REFE
        CMPB    G1
        BCC     ZEROO       ;JMP IF PASSED TARGET
        RTS

ZERO3:  LDAB    REFE
        CMPB    G2
        BCC     ZEROO       ;JMP IF PASSED TARGET
        RTS

ZEROO:  LDD     #0
        STD     SPEEDH      ;ZERO CROSSING SET TO 0
        CLR     ROLLN       ;CLEAR NUMBER OF ROLLS
        RTS
```

;*************************************************************
;DO MANUAL MOTOR COMMANDS FROM PE0 ATOD CONVERSION FOR SPEED
;DISREGARD THE ENCODER COUNTS
;128 AND ABOVE = CLOCKWISE ROTATION WITH GREATEST SPEED = 255
;127 AND BELOW = COUNTER CLOCKWISE  WITH GREATEST SPEED = 0
;127,128 = 0 SPEED

```
AMOT:   LDX     #1000H
        BRCLR   AMOT2,40H,PG,X   ;JMP IF IN MOTOR MANUAL CONTROL

BRCLR   AMOT4,01H,FLG    ;JMP IF NOT BEEN IN MANUAL MODE
        BCLR    01H,FLG
        LDD     #0
        STD     SPEDCH
```

CES.S

```
              JSR       MPUL         ;STOP MOTOR FOR HOME POSITION
AMOT4:        RTS

AMOT2:        LDD       TIMII        ;TIMER INTERRUPT VALUE EACH BIT=.5
24 SECONDS
              CPD       #1
              BCC       AMOT3
              RTS
AMOT3:        LDD       #0
              STD       TIMII
              BSET      01H,FLG      ;INDICATE BEEN IN MANUAL MODE
              JSR       ATOD         ;SPEED IN ACCB COUNTERCLK ,ACCA CL
KWISE
              STAB      M1           ;COUNTERCLK
              STAA      M2           ;CLKWISE

LDAB      M2           ;CLKWISE
              SUBB      M1           ;CLKWISE-COUNTERCLK
              BCC       AMOTCW       ;JMP IF CLOCKWISE

AMOCCW:       LDAB      M1
              SUBB      M2
              CLRA
              LSLD
              LSLD
              LSLD                   ;MULTIPLY BY 8 MOTORS 1,2,3
              STD       M1           ;MAX SPEED 2048
              LDAB      ADDR
              CMPB      #3
              BNE       AMCCW1       ;JMP IF NOT MOTOR 4
              LDD       M1
              LSLD
              LSLD
              STD       M1           ;MAX SPEED 8192
AMCCW1:       LDD       M1
              STD       SPEDCH
              BSET      40H,SPEDCH   ;COUNTERCLOCKWISE ROTATION
              JSR       MPUL
              LDAB      #255
              STAB      CCKF         ;FLAG FOR COUNTERCLOCKWISE ROTATION
              RTS

AMOTCW:       CLRA
              LSLD
              LSLD
              LSLD                   ;MULTIPLY BY 8 MOTORS 1,2,3
              STD       M1           ;MAX SPEED 2048
              LDAB      ADDR
              CMPB      #3
              BNE       AMOCW1       ;JMP IF NOT MOTOR 4
              LDD       M1
```

CES.S

```
        LSLD
        LSLD
        STD     M1              ;MAX SPEED 8192
AMOCW1:  LDD    M1
        STD     SPEDCH
        BCLR    40H,SPEDCH      ;CLOCKWISE ROTATION
        JSR     MPUL
        CLR     CCKF    ;FLAG FOR CLOCKWISE
        RTS
```

;************************************************************
;GET ENCODER COUNTS

```
GEC:    LDAB    INFO
        STAB    G3
        LDAB    ENCH
        STAB    G2
        LDAB    ENCL
        STAB    G1
        LDAB    INFO
        CMPB    G3
        BNE     GEC
        LDAB    ENCH
        CMPB    G2
        BNE     GEC

LSR     G3
        ROR     G2
        ROR     G1

LDAA    G2
        LDAB    G1
        STD     ENCS    ;STORE ENCODER COUNTS
        RTS
```

;************************************************************
;TIMER OVERFLOW INTERRUPT

```
TIMER:  LDAA    #80H
        STAA    1025H   ;RESET TIMER OVERFLOW FLAG
        LDD     TIMEI
        ADDD    #1
        STD     TIMEI
        LDD     TIMII
        ADDD    #1
        STD     TIMII   ;EACH BIT = .524288 SECONDS
TIMEE:  RTI
```

;************************************************************
;CALCULATE TOTAL TIME FROM START IN TIMEH AND TIMEL (4 BYTES)
;8 USEC A BIT TOTAL TIME POSSIBLE = 2^32 * 8USEC = 9.5443 HOURS

CES.S

```
TTIME:   LDD     TIMEI
         STD     M1
         LDD     TCNT
         SUBD    TIMEB
         STD     TIMEL
         BCC     TTIME1    ;JMP IF POS
         LDD     TIMEI
         SUBD    #1
         STD     TIMEH
         BRA     TTIME2
TTIME1:  LDD     TIMEI
         STD     TIMEH
TTIME2:  LDD     TIMEI
         CPD     M1
         BNE     TTIME     ;MAKE SURE NO ROLLOVER
         RTS

;****************************************************
;SEE IF TIME FOR COMMAND

SEET:    JSR     TTIME     ;CAL TIME FROM START
         LDD     COMQ+1    ;FIRST DOUBLE BYTE OF TIME CODE
         SUBD    TIMEL
         LDAB    COMQ+3
         SBCB    TIMEH+1
         LDAB    COMQ+4
         SBCB    TIMEH
         RTS               ;RETURN CLEAR CARRY IF NOT TIME YET

;****************************************************
;24 BIT BINARY IN NBIN,  G1,G2,G3,G4,G5,G6 ASCII-48

BINASC:  LDY     #G1
BIN2:    LDAA    #0
         STAA    0,Y
         INY
         CPY     #G6+1
         BCS     BIN2

LDAB    #1
         STAB    M1
         LDY     #G1+5
         LDX     #BINT+10
BIN3:
         LDD     NBIN+1
         SUBD    0,X
         LDAB    NBIN
         SBCB    M1
         BCC     BIN1
```

CES.S

```
        CPX     #BINT
        BEQ     BINOUT
        DEX
        DEX
        DEY
        CLR     M1
        BRA     BIN3

BIN1:
        LDD     NBIN+1
        SUBD    0,X
        STD     NBIN+1
        LDAB    NBIN
        SBCB    M1
        STAB    NBIN
        INC     0,Y
        BRA     BIN3

BINOUT: RTS

BINT:   .WORD   1,10,100,1000,10000,86A0H
```

;****************************************************************

```
WATCH:  PSHX
        LDX     #1000H
        BCLR    10H,PD,X
        BSET    10H,PD,X
        PULX
        RTS
```

;****************************************************************
;1 MSEC DELAY

```
DLY1:   PSHX
        LDX     #329        ;333 * 3 USEC = 1 MSEC
DLY2:   DEX                 ;1.5 USEC
        BNE     DLY2        ;1.5 USEC
        PULX
        RTS
```

;5 MSEC DELAY

```
DLY5:   PSHX
        LDX     #1663       ;1666 * 3 USEC = 5 MSEC
DLY6:   DEX
        BNE     DLY6
        PULX
        RTS
```

;8.33 MSEC DELAY

CES.S

```
DLY833:  PSHX
         LDX     #2774    ;2777 * 3 USEC = 8.33 MSEC
DLY833B: DEX
         BNE     DLY833B
         PULX
         RTS

;10 MSEC DELAY

DLY10:   PSHX
         LDX     #3329    ;3333 * 3 USEC = 10 MSEC
DLY11:   DEX
         BNE     DLY11
         PULX
         RTS

;20 MSEC DELAY

DLY20:   PSHX
         LDX     #6661    ;6666 * 3 USEC = 20 MSEC
DLY21:   DEX
         BNE     DLY21
         PULX
         RTS

;50 MSEC DELAY

DLY50:   PSHX
         LDX     #16661   ;16666 * 3 USEC = 50 MSEC
DLY51:   DEX
         BNE     DLY51
         PULX
         RTS

;100 MSEC DELAY

DLY100:  PSHX
         LDX     #33329   ;33333 * 3 USEC = 100 MSEC
DLY101:  DEX
         BNE     DLY101
         PULX
         RTS

;****************************************************************
;16 X 16 MULTIPLY M1 * M2 = R2 R1   R2 HI WORD R1 LO WORD

XMUL:    PSHA
         PSHB

LDD     #0
```

CES.S

```
            STD     R2
            LDAA    M1+1
            LDAB    M2+1
            MUL
            STD     R1
            LDAA    M1+1
            LDAB    M2
            MUL
            ADDD    R2+1
            STD     R2+1
            BCC     XMU10
            INC     R2
XMU10:      LDAA    M1
            LDAB    M2+1
            MUL
            ADDD    R2+1
            STD     R2+1
            BCC     XMU20
            INC     R2
XMU20:      LDAA    M1
            LDAB    M2
            MUL
            ADDD    R2
            STD     R2
XMU50:
            PULB
            PULA
            RTS

;****************************************************************
***
;32 X 32 DIV   N2 N1 / D2 D1 = DIVR   WHERE DIVR+3 LSBYTE
;THE RAW BINARY VALUE OF D1 D2 MUST BE LARGER THAN N1 N2
;IF NOT THE FINAL VALUE = FFFF FFFF  EXAMPLE
;XXXX XX.XX / X.XXX XXXX = XXXX X.XXX  THE NUM ADDS 8 BITS RIGHT
;AND DENOMINATOR ADDS 4 BITS RIGHT OF DECIMAL PLACE MAKING THE FIN
AL
;RESULT WITH DECIMAL 12 BITS TO THE LEFT
;N2 AND D2 ARE THE MOST SIGNIFICANT WORD

XDIV:       LDAA    #32
            STAA    T2      ;COUNTER
            LDD     #0
            STD     DIVR
            STD     DIVR+2
XDIV1:      LDD     N1
            SUBD    D1
            STD     N1
            LDAB    N2+1
            SBCB    D2+1
            STAB    N2+1
```

CES.S

```
            LDAB    N2
            SBCB    D2
            STAB    N2
            BCC     XDIV2
            LDD     N1
            ADDD    D1
            STD     N1
            LDAB    N2+1
            ADCB    D2+1
            STAB    N2+1
            LDAB    N2
            ADCB    D2
            STAB    N2
            CLC
            BRA     XDIV3
XDIV2:      SEC
XDIV3:      ROL     DIVR+3
            ROL     DIVR+2
            ROL     DIVR+1
            ROL     DIVR
            LSR     D2
            ROR     D2+1
            ROR     D1
            ROR     D1+1
            DEC     T2
            BNE     XDIV1
            LSL     DIVR+3
            ROL     DIVR+2
            ROL     DIVR+1
            ROL     DIVR
            RTS

;***********************************************
;TRANSMIT BYTE IN B ACCUMULATOR

TRAN:       LDX     #1000H
TRAN3:      BRCLR   TRAN3,80H,SCSR,X
            STAB    102FH           ;SEND DATA
            RTS

;***********************************************
;RECEIVE INTERRUPT ROUTINE

RECD:       LDX     #1000H
RECD2:      BRCLR   RECD2,20H,SCSR,X        ;JMP TO SELF UNTIL BUFFER
FULL
            LDAB    RAMC
            CLRA
            XGDY                    ;LOAD Y INDEX BASED ON RAMC
            LDAB    102FH           ;GET BYTE
            STAB    RAMS,Y          ;STORE BYTE
```

CES.S

```
            INC     RAMC
            LDAB    RAMC
            CMPB    #45
            BCS     RECD1           ;JMP IF RAMC > 9
            CLR     RAMC
RECD1:      RTI

;********************************************************
; WRITE TO EEPROM MEMEORY
; X CONTAINS ADDRESS TO WRITE TO Y CONTAINS DATA ADDRESS
; WRITE ONE BYTE

WRIT1:      NOP
            LDAB    #16H
            JSR     PROG
            LDAB    #02H
            JSR     PROG
            RTS

;*************************************************
; WRITE TO EEPROM MEMEORY
; X CONTAINS ADDRESS TO WRITE TO Y CONTAINS DATA ADDRESS
; WRITE DOUBLE BYTE

WRITE:      LDD     0,X
            CPD     0,Y
            BEQ     WRITD
            SEI
            JSR     ERASE
            JSR     WRITEE
            CLI
WRITD:      RTS

ERASE:      NOP
            LDAB    #16H
            JSR     PROG
            INX
            LDAB    #16H
            JSR     PROG
            DEX
            RTS

WRITEE:     LDAB    #02H
            JSR     PROG
            INX
            INY
            LDAB    #02H
            JSR     PROG
            RTS

;*********************************
```

CES.S

;USED FOR BOTH ERASING AND WRITING

```
PROG:   STAB    103BH
        LDAA    0,Y
        STAA    0,X
        INC     103BH
        JSR     DLY10       ;10 MSEC DELAY
        DEC     103BH
        CLR     103BH
        RTS
```

;********************************
;ATOD CONVERTER

```
ATOD:   LDX     #1000H
        LDAA    #80H        ;TURN ON VOLTAGE TO A TO D
        STAA    39H,X
        LDAA    #10H        ;single conversion on pe0
        STAA    30H,X
        NOP
        NOP
        NOP
        NOP
ATOD1:  BRCLR   ATOD1,80H,30H,X
        LDAA    #0          ;TURN OFF VOLTAGE TO A TO D
        STAA    39H,X
        LDAB    1031H       ;GET RESULT FROM PE0
        LDAA    1032H       ;GET RESULT FROM PE1
        RTS
```

;****************************************************
;INPUT CAPTURE 1 DO REFERENCE LOAD 0 INTO COUNTERS
;CAPTURE ON ANY EDGE

```
IPC1:   LDX     #1000H
        BCLR    20H,PD,X    ;TOGGLE LOAD LINE FOR 74193 COUNTERS
        BSET    20H,PD,X    ;TOGGLE LOAD LINE FOR 74193 COUNTERS
        INC     REFE
        LDAB    #1
        STAB    INCAPF
        STAB    IPCFLG
        LDAA    #00H
        STAA    1022H       ;TURN OFF INT
        LDD     TCNT
        STD     IPCTIM
        RTI
```

;*******************************
;SEE IF MAKE INTERRUPT ACTIVE

CES.S

```
IPACT:   LDAB    IPCFLG
         BNE     IPACT0
         RTS
IPACT0:  LDAB    INCAPF
         BEQ     IPACT1
         RTS
IPACT1:  LDD     TCNT
         SUBD    IPCTIM
         CPD     #40000          ;COMPARE 320 MSEC
         BCC     IPACT2
         RTS
IPACT2:  LDAA    #04H
         STAA    1023H           ;CLEAR FLG
         LDAA    #04H
         STAA    1022H           ;ENABLE INPUT CAPTURE 1
         CLR     IPCTIM
         RTS

;**********************************
;INPUT CAPTURE SERVICE ROUTINE

IPCS:    LDAB    INCAPF
         BNE     IPCS1
         RTS

IPCS1:   CLR     INCAPF
         LDAB    STOPF
         BNE     IPCS2           ;JMP IF DOING HOME POSITION

LDAB    ADDR
         CMPB    #3              ;SEE IF MOTOR 4
         BNE     IPCS2           ;JMP IF NOT MOTOR 4 STOP MOTOR
         RTS

IPCS2:   LDAB    #0
         STAB    SPEDCL
         STAB    SPEEDL
         LDAB    #0
         STAB    SPEDCH
         STAB    SPEEDH
         JSR     MPUL            ;STOP MOTOR FOR HOME POSITION
         CLR     STOPF
         RTS

.END
```

We claim:

1. A motion simulator apparatus for providing motion cues to passengers, comprising:
   (a) a passenger-holding capsule having a first end and a second end and a center point between said first end and said second end, and having a means for permitting passenger entrance into said capsule and a means for permitting passenger exit from said capsule;
   (b) a vertical movement means for imparting vertical movement to said first end of passenger-holding capsule;
   (c) a horizontal movement means for imparting front-to-back movement to said passenger-holding capsule;
   (d) a lateral movement means for imparting side-to-side movement to said first end of passenger-holding capsule;
   (e) a pivot movement means for imparting pivot movement about said center point of passenger-holding capsule;
   (f) a rotation movement means for imparting rotational movement about an axis defined as the line from said first end of passenger-holding capsule to said second end of passenger-holding capsule, and running essentially through the center of said passenger holding capsule; and
   (g) a control means for providing directional and velocity controls to said passenger-holding capsule.

2. A motion simulator apparatus as recited in claim 1 further comprising a vertical movement means for imparting vertical movement to said second end of passenger-holding capsule.

3. A motion simulator apparatus as recited in claim 1 further comprising a lateral movement means for imparting side-to-side movement to said second end of passenger-holding capsule.

4. A motion simulator apparatus as recited in claim 1 wherein said rotational movement means provides rotations of from 0 to 360 degrees in extent.

5. A motion simulator apparatus as recited in claim 1 wherein said passenger-holding capsule further comprises an oblong tube closed on each end by said first end and said second end.

6. A motion simulator apparatus as recited in claim 1 wherein said passenger-holding capsule further comprises an exterior structure.

7. A motion simulator apparatus for providing motion cues to passenger, comprising:
   (a) a passenger-holding capsule having a first end and a second end and a center point between said first end and said second end, and having a means for permitting passenger exit from said capsule;
   (b) a vertical movement means for imparting vertical movement to said first end of passenger-holding capsule;
   (c) a control means for providing directional and velocity controls to said passenger-holding capsule; and
   (d) a means for providing force to said passenger-holding capsule.

8. A motion simulator apparatus for providing motion cues to passengers, comprising:
   (a) a passenger-holding capsule having a first end and a second end and a center point between said first end and said second end, and having a means for permitting passenger entrance into said capsule and a means for permitting passenger exit from said capsule;
   (b) a lateral movement means for imparting side-to-side movement to said first end of passenger-holding capsule, said lateral movement means further comprises:
      (i) a first mound attached to said first end of said passenger-holding capsule;
      (ii) a first support member attached to said first mount for supporting said passenger-holding capsule;
      (iii) a lateral rolling means attached to said first support member;
      (iv) a first lateral track member through which said lateral rolling means moves; and
      (v) a second lateral track member through which said lateral rolling means moves; and
   (c) a control means for providing directional and velocity controls to said passenger-holding capsule.

9. A motion simulator apparatus for providing motion cues to passengers, comprising:
   (a) a passenger-holding capsule having a first end and a second end and a center point between said first end and said second end, and having a means for permitting passenger entrance into said capsule and a means for permitting passenger exit from said capsule;
   (b) a lateral movement means for imparting side-to-side movement to said first end of passenger-holding capsule, said lateral movement means further comprising a means for providing force to said passenger-holding capsule; and
   (c) a control means for providing directional and velocity controls to said passenger-holding capsule.

10. A motion simulator apparatus for providing motion cues to passengers, comprising:
    (a) passenger-holding capsule having a first end and a second end and a center point between said first end and said second end, and having a means for permitting passenger entrance into said capsule and a means for permitting passenger exit from said capsule;
    (b) a lateral movement means for imparting side-to-side movement to said first end of passenger-holding capsule;
    (c) control means for providing directional and velocity controls to said passenger-holding capsule;
    (d) a first mount attached to said first end of said passenger-holding capsule;
    (e) a first support member attached to said first mount for supporting said passenger-holding capsule;
    (f) a second mount attached to said second end of said passenger-holding capsule;
    (g) a second support member attached to said second mount for supporting said passenger-holding capsule; and
    (h) a control means for providing directional and velocity controls to said lateral movement means, wherein said control means further comprises:
       (i) a processor external to said passenger-holding capsule;
       (ii) a means for utilizing said processor to manage said motion simulator apparatus;
       (iii) a means for communicating command controls from said processor to said first support member; and
       (iv) a means for communicating command controls from said processor to said second support member.

11. A motion simulator apparatus for providing motion cues to passengers, comprising:
    (a) a passenger-holding capsule having a first end and a second end and a center point between said first end and said second end, and having a means for permitting passenger entrance into said capsule and a means for permitting passenger exit from said capsule;

(b) a lateral movement means for imparting side-to-side movement to said first end of passenger-holding capsule, said lateral movement means further comprising:
  (i) a second mount attached to said second end of said passenger-holding capsule;
  (ii) a second support member attached to said second mount for supporting said passenger-holding capsule;
  (iii) a lateral rolling means attached to said second support member;
  (iv) a third lateral track member through which said lateral rolling means moves; and
  (v) a fourth lateral track member through which said lateral rolling means moves;

(c) a lateral movement means for imparting side-to-side movement to said second end of passenger-holding capsule; and (d) a control means for proving directional and velocity controls to said passenger-holding capsule.

12. A motion simulator apparatus for providing motion cues to passengers, comprising:
  (a) a passenger-holding capsule having a first end and a second end and a center point between said first end and said second end, and having a means for permitting passenger entrance into said capsule and a means for permitting passenger exit from said capsule;
  (b) a lateral movement means for imparting side-to-side movement to said first end of passenger-holding capsule, said lateral movement means further comprising a means for providing force to said passenger-holding capsule;
  (c) a lateral movement means for imparting side-to-side movement to said second end of passenger-holding capsule, said lateral movement means further comprising a means for providing force to said passenger-holding capsule; and
  (d) a control means for providing directional and velocity controls to said passenger-holding capsule.

13. A motion simulator apparatus for providing motion cues to passengers, comprising:
  (a) passenger-holding capsule having a first end and a second end and a center point between said first end and said second end, and having a means for permitting passenger entrance into said capsule and a means for permitting passenger exit from said capsule;
  (b) a lateral movement means for imparting side-to-side movement to said first end of passenger-holding capsule;
  (c) control means for providing directional and velocity controls to said passenger-holding capsule;
  (d) a first mount attached to said first end of said passenger-holding capsule;
  (e) a first support member attached to said first mount for supporting said passenger-holding capsule;
  (f) a second mount attached to said second end of said passenger-holding capsule;
  (g) a second support member attached to said second mount for supporting said passenger-holding capsule, wherein said second support member functions independently with respect to said first support member;
  (h) a lateral movement means for imparting side-to-side movement to said second end of passenger-holding capsule; and
  (i) a control means for providing directional and velocity controls to said lateral movement means.

14. A motion simulator apparatus for providing motion cues to passengers, comprising:
  (a) passenger-holding capsule having a first end and a second end and a center point between said first end and said second end, and having a means for permitting passenger entrance into said capsule and a means for permitting passenger exit from said capsule;
  (b) a lateral movement means for imparting side-to-side movement to said first end of passenger-holding capsule;
  (c) control means for providing directional and velocity controls to said passenger-holding capsule;
  (d) a first mount attached to said first end of said passenger-holding capsule;
  (e) a first support member attached to said first mount for supporting said passenger-holding capsule;
  (f) a second mount attached to said second end of said passenger-holding capsule;
  (g) a second support member attached to said second mount for supporting said passenger-holding capsule;
  (h) a lateral movement means for imparting side-to-side movement to said second end of passenger-holding capsule; and
  (i) a control means for providing directional and velocity controls to said lateral movement means, said control means further comprises:
    (i) a processor external to said passenger-holding capsule;
    (ii) a process executing on said processor for managing said motion simulator apparatus;
    (iii) a means for communicating command controls from said processor to said first support member; and
    (iv) a means for communicating command controls from said processor to said second support member.

15. A motion simulator apparatus for providing motion cues to passengers, comprising:
  (a) a passenger-holding capsule having a first end and a second end and a center point between said first end and said second end, and having a means for permitting passenger entrance into said capsule and a means for permitting passenger exit from said capsule;
  (b) a horizontal movement means for imparting front-to-back movement to said passenger-holding capsule, said horizontal movement means further comprising:
    (i) a first mount attached to said first end of said passenger-holding capsule;
    (ii) a first support member attached to said first mount for supporting said passenger-holding capsule;
    (iii) a second mount attached to said second end of said passenger-holding capsule;
    (iv) a second support member attached to said second mount for supporting said passenger-holding capsule;
    (v) a horizontal rolling means attached to said first support member;
    (vi) a horizontal rolling means attached to said second support member;
    (vii) a first horizontal track member through which both said horizontal rolling means moves; and
    (viii) a second horizontal track member through which both said horizontal rolling means moves; and
  (c) a control means for providing directional and velocity controls to said passenger-holding capsule.

16. A motion simulator apparatus for providing motion cues to passengers, comprising
   (a) a passenger-holding capsule having a first end and a second end and a center point between said first end and said second end, and having a means for permitting passenger entrance into said capsule and a means for permitting passenger exit from said capsule;
   (b) a horizontal movement means for imparting front-to-back movement to said passenger-holding capsule, and said horizontal movement means further comprises a means for providing force to said passenger-holding capsule; and
   (c) a control means for providing directional and velocity controls to said passenger-holding capsule.

17. A motion simulator apparatus for providing motion cues to passengers, comprising:
   (a) a passenger-holding capsule having a first end and a second end and a center point between said first end and said second end, and having a means for permitting passenger entrance into said capsule and a means for permitting passenger exit from said capsule;
   (b) a horizontal movement means for imparting front-to-back movement to said passenger-holding capsule, wherein said horizontal movement means further comprises a control means for providing directional and velocity controls to said lateral movement means; and
   (c) a control means for providing directional and velocity controls to said passenger-holding capsule, wherein said control means further comprises:
      (i) a processor external to said passenger-holding capsule;
      (ii) a process executing on said processor for managing said motion simulator apparatus;
      (iii) a means for communicating command controls from said processor to said first support member; and
      (iv) a means for communicating command controls from said processor to said second support member.

18. A motion simulator apparatus for providing motion cues to passengers, comprising:
   (a) a passenger-holding capsule having a first end and a second end and a center point between said first end and said second end, and having a means for permitting passenger entrance into said capsule and a means for permitting passenger exit from said capsule;
   (b) a pivot movement means for imparting pivot movement about said center point of passenger-holding capsule, and said pivot movement means further comprises:
      (i) a first mount attached to said first end of said passenger-holding capsule;
      (ii) a first support member attached to said first mount for supporting said passenger-holding capsule;
      (iii) a pivotal rolling means attached to said first support member;
      (iv) a first pivotal track member through which said pivotal rolling means moves; and
      (v) a second pivotal track member through which said pivotal rolling means moves; and
   (c) a control means for providing directional and velocity controls to said passenger-holding capsule.

19. A motion simulator apparatus for providing motion cues to passengers, comprising:
   (a) a passenger-holding capsule having a first end and a second end and a center point between said first end and said second end, and having a means for permitting passenger entrance into said capsule and a means for permitting passenger exit from said capsule;
   (b) a pivot movement means for imparting pivot movement about said center point of passenger-holding capsule, said pivotal movement means further comprises a means for providing force to said passenger-holding capsule; and
   (c) a control means for providing directional and velocity controls to said passenger-holding capsule.

20. A motion simulator apparatus for providing motion cues to passengers, comprising:
   (a) a passenger-holding capsule having a first end and a second end and a center point between said first end and said second end, and having a means for permitting passenger entrance into said capsule and a means for permitting passenger exit from said capsule;
   (b) a rotation movement means for imparting rotation movement about an axis defined as the line from said first end of passenger-holding capsule to said second end of passenger-holding capsule, and running essentially through the center of said passenger holding capsule, said rotation movement means further comprises a means for providing force to said passenger-holding capsule; and
   (c) a control means for providing directional and velocity controls to said passenger-holding capsule.

21. A motion simulator apparatus for providing motion cues to passengers, comprising:
   (a) a passenger-holding capsule having a first end and a second end and a center point between said first end and said second end, and having a plurality of doors for the passengers entrance into said capsule and exit from said capsule;
   (b) a vertical movement mechanism comprising:
      (i) a spindle connected to said passenger-holding capsule;
      (ii) a support structure having a first side and a second side and a cross member and having said cross member connected to said spindle;
      (iii) a ball screw device having a first end and a second end, having said first end connected to said support structure and having said ball screw device contained within said first side of said support structure;
      (iv) a belt device connected to said second end of said ball screw device;
      (v) a motor device connected to said belt device to provide power to turn said ball screw device and hence raise or lower said support structure and through said support structure raise and lower said spindle and said passenger holding capsule;
      (vi) a motor controller device electrically connected to said motor device to provide on/off, speed and direction controls to said motor device;
      (vii) a processor device electrically connected to said motor controller device to command the operation of said motor controller; and
      (viii) a pneumatic load bearing device residing in said second side of said support structure and connected to said cross member of said support structure to carry the load of said passenger-holding capsule;
   (c) a horizontal movement mechanism comprising:
      (i) a support structure having a first side and a second side and connected to said passenger-holding capsule through a spindle;
      (ii) a ball screw device having a first end and a second end, having said first end connected to said support structure and having said ball screw device contained under said support structure;

(iii) a belt device connected to said second end of said ball screw device;

(iv) a motor device connected to said belt device to provide power to turn said ball screw device and hence move said support structure and through said support structure horizontally and correspondingly said passenger holding capsule is moved horizontally;

(v) a motor controller device electrically connected to said motor device to provide on/off, speed and direction controls to said motor device;

(vi) a processor device electrically connected to said motor controller device to command the operation of said motor controller; and (vii) a plurality of wheels connected to the bottom of said support structure; and (viii) a first and a second horizontal rails on which said plurality of wheels ride providing a rolling motion along said rails in the horizontal direction;

(d) a pivot movement mechanism comprising:

(i) a support structure having a first side and a second side and connected to said passenger-holding capsule through a spindle;

(ii) a flywheel device having a first side and a second side, having said first side connected to said support structure and having said flywheel device contained under said support structure;

(iii) a belt device connected to said second end of said flywheel device;

(iv) a motor device connected to said belt device to provide power to turn said flywheel device and hence move said support structure and pivotally and correspondingly said passenger holding capsule is moved pivotally;

(v) a motor controller device electrically connected to said motor device to provide on/off, speed and direction controls to said motor device;

(vi) a processor device electrically connected to said motor controller device to command the operation of said motor controller; and (vii) a plurality of wheels connected to the bottom of said support structure; and (viii) a first and a second pivot rails on which said plurality of wheels ride providing a rolling motion along said rails in the lateral direction;

(e) a lateral movement mechanism comprising:

(i) a support structure having a first side and a second side and connected to said passenger-holding capsule through a spindle;

(ii) a ball screw device having a first end and a second end, having said first end connected to said support structure and having said ball screw device contained under said support structure;

(iii) a belt device connected to said second end of said ball screw device;

(iv) a motor device connected to said belt device to provide power to turn said ball screw device and hence move said support structure laterally and correspondingly said passenger holding capsule is moved laterally;

(v) a motor controller device electrically connected to said motor device to provide on/off, speed and direction controls to said motor device;

(vi) a processor device electrically connected to said motor controller device to command the operation of said motor controller;

(vii) a plurality of wheels connected to the bottom of said support structure; and (viii) a first and a second lateral rails on which said plurality of wheels ride providing a rolling motion along said rails in the lateral direction;

(f) a rotation movement mechanism comprising:

(i) a support structure having a first side and a second side and a cross member and connected to said passenger-holding capsule through a spindle;

(ii) a flywheel device having a first side and a second side, having said first side connected to said spindle and having said flywheel device mounted on said cross member of said support structure;

(iii) a belt device connected to said second end of said flywheel device;

(iv) a motor device connected to said belt device to provide power to turn said flywheel device and hence move said spindle rotationally and correspondingly move said passenger holding-capsule rotationally;

(v) a motor controller device electrically connected to said motor device to provide on/off, speed and direction controls to said motor device; and (vi) a processor device electrically connected to said motor controller device to command the operation of said motor controller; and (g) a power supply device connected to said motors and to said motor controller and to said processor device to provide the necessary power for the operation of said motion simulator.

22. A motion simulator apparatus for providing motion cues to passengers, comprising:

(a) a passenger-holding capsule having a first end and a second end and a center point between said first end and said second end, and having a plurality of doors for the passengers entrance into said capsule and exit from said capsule;

(b) a vertical movement mechanism comprising:

(i) a spindle connected to said passenger-holding capsule;

(ii) a support structure having a first side and a second side and a cross member and having said cross member connected to said spindle;

(iii) a ball screw device having a first end and a second end, having said first end connected to said support structure and having said ball screw device contained within said first side of said support structure;

(iv) a belt device connected to said second end of said ball screw device;

(v) a motor device connected to said belt device to provide power to turn said ball screw device and hence raise or lower said support structure and through said support structure raise and lower said spindle and said passenger holding capsule;

(vi) a motor controller device electrically connected to said motor device to provide on/off, speed and direction controls to said motor device;

(vii) a processor device electrically connected to said motor controller device to command the operation of said motor controller; and (viii) a pneumatic load bearing device residing in said second side of said support structure and connected to said cross member of said support structure to carry the load of said passenger-holding capsule;

(c) a horizontal movement mechanism comprising:

(i) a support structure having a first side and a second side and connected to said passenger-holding capsule through a spindle;

(ii) a ball screw device having a first end and a second end, having said first end connected to said support structure and having said ball screw device contained under said support structure;

(iii) a belt device connected to said second end of said ball screw device;

(iv) a motor device connected to said belt device to provide power to turn said ball screw device and hence move said support structure and through said support structure horizontally and correspondingly said passenger holding capsule is moved horizontally;

(v) a motor controller device electrically connected to said motor device to provide on/off, speed and direction controls to said motor device;

(vi) a processor device electrically connected to said motor controller device to command the operation of said motor controller;

(vii) a plurality of wheels connected to the bottom of said support structure; and (viii) a first and a second horizontal rails on which said plurality of wheels ride providing a rolling motion along said rails in the horizontal direction;

(d) a rotation movement mechanism comprising:

(i) a support structure having a first side and a second side and a cross member and connected to said passenger-holding capsule through a spindle;

(ii) a flywheel device having a first side and a second side, having said first side connected to said spindle and having said flywheel device mounted on said cross member of said support structure;

(iii) a belt device connected to said second end of said flywheel device;

(iv) a motor device connected to said belt device to provide power to turn said flywheel device and hence move said spindle rotationally and correspondingly move said passenger holding-capsule rotationally;

(vi) a motor controller device electrically connected to said motor device to provide on/off, speed and direction controls to said motor device; and (vii) a processor device electrically connected to said motor controller device to command the operation of said motor controller; and (e) a power supply device connected to said motors and to said motor controller and to said processor device to provide the necessary power for the operation of said motion simulator.

23. A motion simulator apparatus for providing motion cues to passengers, comprising:

(a) a passenger-holding capsule having a first end and a second end and a center point between said first end and said second end, and having a plurality of doors for the passengers entrance into said capsule and exit from said capsule;

(b) a rotation movement mechanism comprising:

(i) a support structure having a first side and a second side and a cross member and connected to said passenger-holding capsule through a spindle;

(ii) a flywheel device having a first side and a second side, having said first side connected to said spindle and having said flywheel device mounted on said cross member of said support structure;

(iii) a belt device connected to said second end of said flywheel device;

(iv) a motor device connected to said belt device to provide power to turn said flywheel device and hence move said spindle rotationally and correspondingly move said passenger holding-capsule rotationally;

(vi) a motor controller device electrically connected to said motor device to provide on/off, speed and direction controls to said motor device; and (vii) a processor device electrically connected to said motor controller device to command the operation of said motor controller; and (e) a power supply device connected to said motors and to said motor controller and to said processor device to provide the necessary power for the operation of said motion simulator.

* * * * *